(12) United States Patent
Fan et al.

(10) Patent No.: US 9,376,318 B2
(45) Date of Patent: Jun. 28, 2016

(54) CONVERSION OF CARBONACEOUS FUELS INTO CARBON FREE ENERGY CARRIERS

(71) Applicant: The Ohio State University, Columbus, OH (US)

(72) Inventors: Liang-Shih Fan, Columbus, OH (US); Fanxing Li, Columbus, OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 14/504,295

(22) Filed: Oct. 1, 2014

(65) Prior Publication Data
US 2015/0093577 A1    Apr. 2, 2015

Related U.S. Application Data

(62) Division of application No. 13/121,009, filed as application No. PCT/US2009/058579 on Sep. 28, 2009, now Pat. No. 8,877,147.

(60) Provisional application No. 61/100,520, filed on Sep. 26, 2008.

(51) Int. Cl.
| | |
|---|---|
| *B01J 19/30* | (2006.01) |
| *C01B 3/34* | (2006.01) |
| *C10J 3/12* | (2006.01) |
| *C10J 3/46* | (2006.01) |
| *C10J 3/72* | (2006.01) |
| *F23C 99/00* | (2006.01) |

(Continued)

(52) U.S. Cl.
CPC . *C01B 3/344* (2013.01); *C10J 3/12* (2013.01); *C10J 3/463* (2013.01); *C10J 3/725* (2013.01);

(Continued)

(58) Field of Classification Search
CPC .............. C01B 3/02; C01B 3/32; C01B 3/34; C01B 3/344; C10J 3/02; C10J 3/06; C10J 3/12; C10J 3/46; C10J 3/463; C10J 3/72; C10J 3/725; C10J 2300/09; C10J 2300/0913; C10J 2300/0916; C10J 2300/093; C10J 2300/16; C10J 2300/1671; C10J 2300/18; C10J 2300/1807; C10J 2300/1861; C10J 2300/1869; C10J 2300/1884; F23C 99/00; F23C 2900/99008; Y02E 20/10; Y02E 20/16; Y02E 20/30; Y02E 20/34; Y02E 20/346; B01J 19/30; B01J 2219/30; B01J 2219/304–2219/30416; B01J 2219/32; B01J 2219/324; B01J 2219/3408; B01J 2219/32426
See application file for complete search history.

(56) References Cited

U.S. PATENT DOCUMENTS

| | | |
|---|---|---|
| 971,206 A | 9/1910 | Messerschmitt |
| 1,078,686 A | 11/1913 | Lane |

(Continued)

FOREIGN PATENT DOCUMENTS

| | | |
|---|---|---|
| CN | 101389734 | 3/2009 |
| CN | 101426885 | 5/2009 |

(Continued)

OTHER PUBLICATIONS

International Search Report cited in International Patent Application No. PCT/US2009/058579 (Jun. 14, 2010).

(Continued)

*Primary Examiner* — Natasha Young
(74) *Attorney, Agent, or Firm* — Michael Best & Friedrich LLP

(57) ABSTRACT

A system for converting fuel is provided and includes a first reactor comprising a plurality of ceramic composite particles, the ceramic composite particles comprising at least one metal oxide disposed on a support, wherein the first reactor is configured to reduce the at least one metal oxide with a fuel to produce a reduced metal or a reduced metal oxide; a second reactor configured to oxidize at least a portion of the reduced metal or reduced metal oxide from the said first reactor to produce a metal oxide intermediate; a source of air; and a third reactor communicating with said source of air and configured to regenerate the at least one metal oxide from the remaining portion of the solids discharged from the said first reactor and the solids discharged from the said second reactor by oxidizing the metal oxide intermediate.

20 Claims, 12 Drawing Sheets

(51) Int. Cl.
- *C01B 3/02* (2006.01)
- *C01B 3/32* (2006.01)
- *C10J 3/02* (2006.01)
- *C10J 3/06* (2006.01)

(52) U.S. Cl.
CPC ........... *F23C 99/00* (2013.01); *C10J 2300/093* (2013.01); *C10J 2300/0916* (2013.01); *C10J 2300/1671* (2013.01); *C10J 2300/1807* (2013.01); *C10J 2300/1869* (2013.01); *C10J 2300/1884* (2013.01); *F23C 2900/99008* (2013.01); *Y02E 20/16* (2013.01); *Y02E 20/346* (2013.01); *Y10T 428/2982* (2015.01)

(56) References Cited

U.S. PATENT DOCUMENTS

| | | |
|---|---|---|
| 1,658,939 A | 2/1928 | Parsons |
| 2,182,747 A | 12/1939 | Marshall, Jr. |
| 2,198,560 A | 4/1940 | Marshall, Jr. |
| 2,449,635 A | 9/1948 | Barr |
| 2,614,067 A | 10/1952 | Reed et al. |
| 2,635,947 A | 4/1953 | Reed et al. |
| 2,686,819 A | 8/1954 | Johnson |
| 2,694,622 A | 11/1954 | Reed et al. |
| 2,697,686 A | 12/1954 | Leffer |
| 2,899,374 A | 8/1959 | Gomory |
| 3,027,238 A | 3/1962 | Watkins |
| 3,031,287 A | 4/1962 | Benson et al. |
| 3,338,667 A | 8/1967 | Pundsack |
| 3,353,925 A | 11/1967 | Baumann et al. |
| 3,421,869 A | 1/1969 | Benson |
| 3,442,613 A | 5/1969 | Grotz, Jr. |
| 3,442,619 A | 5/1969 | Huebler et al. |
| 3,442,620 A | 5/1969 | Huebler et al. |
| 3,494,858 A | 2/1970 | Luckenbach |
| 3,573,224 A | 3/1971 | Strelzoff et al. |
| 3,619,142 A | 11/1971 | Johnson et al. |
| 3,726,966 A | 4/1973 | Johnston |
| 4,017,270 A | 4/1977 | Funk et al. |
| 4,057,402 A | 11/1977 | Patel et al. |
| 4,108,732 A | 8/1978 | Nuttall, Jr. |
| 4,272,399 A | 6/1981 | Davis et al. |
| 4,325,833 A | 4/1982 | Scott |
| 4,334,959 A | 6/1982 | Green |
| 4,343,624 A | 8/1982 | Belke et al. |
| 4,348,487 A | 9/1982 | Goldstein et al. |
| 4,404,086 A | 9/1983 | Oltrogge |
| 4,420,332 A | 12/1983 | Mori et al. |
| 4,521,117 A | 6/1985 | Ouwerkerk et al. |
| 4,778,585 A | 10/1988 | Graff |
| 4,842,777 A | 6/1989 | Lamort |
| 4,861,165 A | 8/1989 | Fredriksson et al. |
| 4,869,207 A | 9/1989 | Engstrom et al. |
| 4,895,821 A | 1/1990 | Kainer et al. |
| 4,902,586 A | 2/1990 | Wertheim |
| 5,130,106 A | 7/1992 | Koves et al. |
| 5,365,560 A | 11/1994 | Tam |
| 5,447,024 A | 9/1995 | Ishida et al. |
| 5,509,362 A | 4/1996 | Lyon |
| 5,518,187 A | 5/1996 | Bruno et al. |
| 5,529,599 A | 6/1996 | Calderon |
| 5,730,763 A | 3/1998 | Manulescu et al. |
| 5,770,310 A | 6/1998 | Noguchi et al. |
| 5,827,496 A | 10/1998 | Lyon |
| 6,007,699 A | 12/1999 | Cole |
| 6,143,253 A | 11/2000 | Radcliffe et al. |
| 6,180,354 B1 | 1/2001 | Singh et al. |
| 6,361,757 B1 | 3/2002 | Shikada et al. |
| 6,412,559 B1 | 7/2002 | Gunter et al. |
| 6,494,153 B1 | 12/2002 | Lyon |
| 6,509,000 B1 | 1/2003 | Choudhary et al. |
| 6,517,631 B1 | 2/2003 | Bland |
| 6,631,698 B1 | 10/2003 | Hyppanen et al. |
| 6,642,174 B2 | 11/2003 | Gaffney et al. |
| 6,663,681 B2 | 12/2003 | Kinding et al. |
| 6,667,022 B2 | 12/2003 | Cole |
| 6,669,917 B2 | 12/2003 | Lyon |
| 6,682,714 B2 | 1/2004 | Kindig et al. |
| 6,685,754 B2 | 2/2004 | Kindig et al. |
| 6,703,343 B2 | 3/2004 | Park |
| 6,797,253 B2 | 9/2004 | Lyon |
| 6,834,623 B2 | 12/2004 | Cheng |
| 6,875,411 B2 | 4/2005 | Sanfilippo et al. |
| 6,880,635 B2 | 4/2005 | Vinegar et al. |
| 7,001,579 B2 | 2/2006 | Metzger et al. |
| 7,161,028 B2 | 1/2007 | Dubois et al. |
| 7,223,714 B2 | 5/2007 | Beech, Jr. et al. |
| 7,244,399 B2 | 7/2007 | Myohanen et al. |
| 7,404,942 B2 | 7/2008 | Sanfilippo et al. |
| 7,496,450 B2 | 2/2009 | Ortiz Aleman et al. |
| 7,767,191 B2 | 8/2010 | Thomas et al. |
| 7,837,975 B2 | 11/2010 | Iyer et al. |
| 7,840,053 B2 | 11/2010 | Liao |
| 7,902,416 B2 | 3/2011 | Glover et al. |
| 8,116,430 B1 | 2/2012 | Shapiro et al. |
| 8,192,706 B2 | 6/2012 | Grochowski |
| 8,202,349 B2 | 6/2012 | Molaison |
| 8,419,813 B2 | 4/2013 | Hoteit et al. |
| 8,435,920 B2 | 5/2013 | White et al. |
| 8,508,238 B2 | 8/2013 | Mahalingam et al. |
| 8,761,943 B2 | 6/2014 | Lou et al. |
| 8,771,549 B2 | 7/2014 | Gauthier et al. |
| 8,814,963 B2 | 8/2014 | Apanel et al. |
| 8,877,147 B2 | 11/2014 | Fan et al. |
| 2001/0055559 A1 | 12/2001 | Sanfilippo et al. |
| 2003/0024388 A1 | 2/2003 | Scharpf |
| 2003/0031291 A1 | 2/2003 | Yamamoto et al. |
| 2003/0119658 A1 | 6/2003 | Allison et al. |
| 2003/0130360 A1 | 7/2003 | Kindig et al. |
| 2003/0180215 A1 | 9/2003 | Niu et al. |
| 2003/0183579 A1* | 10/2003 | Bandyopadhya et al. .................. B01D 39/2079 210/663 |
| 2003/0188668 A1 | 10/2003 | Bland |
| 2004/0028181 A1 | 2/2004 | Charles, Jr. et al. |
| 2004/0030214 A1 | 2/2004 | Schindler et al. |
| 2004/0109800 A1 | 6/2004 | Pahlman et al. |
| 2004/0126293 A1 | 7/2004 | Geerlings et al. |
| 2004/0131531 A1 | 7/2004 | Geerlings et al. |
| 2004/0132833 A1 | 7/2004 | Espinoza et al. |
| 2004/0138060 A1 | 7/2004 | Rapier et al. |
| 2004/0197612 A1 | 10/2004 | Keefer et al. |
| 2004/0213705 A1 | 10/2004 | Blencoe et al. |
| 2004/0233191 A1 | 11/2004 | Mukherjee et al. |
| 2004/0244289 A1 | 12/2004 | Morozumi et al. |
| 2004/0265224 A1 | 12/2004 | Papavassiliou et al. |
| 2005/0002847 A1 | 1/2005 | Maroto-Valer et al. |
| 2005/0054880 A1 | 3/2005 | Dubois et al. |
| 2005/0175533 A1 | 8/2005 | Thomas et al. |
| 2005/0255037 A1 | 11/2005 | Otsuka et al. |
| 2005/0265912 A1 | 12/2005 | Alvarez, Jr. et al. |
| 2005/0274648 A1 | 12/2005 | Goldstein et al. |
| 2006/0042565 A1 | 3/2006 | Hu |
| 2006/0094593 A1 | 5/2006 | Beech, Jr. et al. |
| 2007/0010588 A1 | 1/2007 | Pearson |
| 2007/0049489 A1 | 3/2007 | Becue et al. |
| 2007/0157517 A1 | 7/2007 | Tsay et al. |
| 2007/0258878 A1 | 11/2007 | Sanfilippo et al. |
| 2008/0031809 A1 | 2/2008 | Norbeck et al. |
| 2008/0161624 A1 | 7/2008 | Glover et al. |
| 2008/0209807 A1 | 9/2008 | Tsangaris et al. |
| 2009/0000194 A1 | 1/2009 | Fan et al. |
| 2009/0042070 A1 | 2/2009 | Brown et al. |
| 2009/0160461 A1 | 6/2009 | Zangl et al. |
| 2010/0071262 A1 | 3/2010 | Robinson et al. |
| 2010/0184589 A1 | 7/2010 | Miyairi et al. |
| 2010/0187159 A1 | 7/2010 | Naunheimer |
| 2010/0258429 A1 | 10/2010 | Ugolin |
| 2010/0293845 A1 | 11/2010 | Zeman et al. |
| 2010/0332170 A1 | 12/2010 | Gao et al. |
| 2011/0005395 A1 | 1/2011 | Vimalchand et al. |
| 2011/0011720 A1 | 1/2011 | Rinker |
| 2011/0054049 A1 | 3/2011 | Lambert et al. |

(56) References Cited

U.S. PATENT DOCUMENTS

| | | |
|---|---|---|
| 2011/0094226 A1 | 4/2011 | McHugh et al. |
| 2011/0146152 A1 | 6/2011 | Vimalchand et al. |
| 2011/0176968 A1 | 7/2011 | Fan et al. |
| 2011/0289845 A1 | 12/2011 | Davis et al. |
| 2011/0291051 A1 | 12/2011 | Hershkowitz et al. |
| 2011/0300060 A1 | 12/2011 | Guillou et al. |
| 2011/0303875 A1 | 12/2011 | Hoteit et al. |
| 2012/0159841 A1 | 6/2012 | Fan et al. |
| 2012/0167585 A1 | 7/2012 | Wormser |
| 2012/0171588 A1 | 7/2012 | Fan et al. |
| 2012/0214106 A1 | 8/2012 | Sit et al. |
| 2013/0085365 A1 | 4/2013 | Marashded et al. |
| 2013/0149650 A1 | 6/2013 | Gauthier et al. |
| 2013/0255272 A1 | 10/2013 | Ajhar et al. |
| 2014/0034134 A1 | 2/2014 | Fan et al. |
| 2014/0072917 A1 | 3/2014 | Fan et al. |
| 2014/0144082 A1 | 5/2014 | Fan et al. |
| 2014/0295361 A1 | 10/2014 | Fan et al. |
| 2015/0238915 A1 | 8/2015 | Fan et al. |

FOREIGN PATENT DOCUMENTS

| | | |
|---|---|---|
| CN | 102612625 | 7/2012 |
| EP | 1134187 | 9/2001 |
| EP | 1138096 | 10/2001 |
| EP | 1445018 | 8/2004 |
| EP | 1580162 | 9/2005 |
| EP | 1845579 | 10/2007 |
| EP | 1933087 | 6/2008 |
| EP | 2450420 | 5/2012 |
| EP | 2515038 | 10/2012 |
| EP | 2601443 | 6/2013 |
| FR | 2924035 | 5/2009 |
| JP | H10249153 | 9/1998 |
| TW | 406055 | 9/2000 |
| TW | 426728 | 3/2001 |
| WO | 90/13773 | 11/1990 |
| WO | 99/65097 | 12/1999 |
| WO | 00/22690 | 4/2000 |
| WO | 00/68339 | 11/2000 |
| WO | 01/42132 | 6/2001 |
| WO | 03/070629 | 8/2003 |
| WO | 2007/082089 | 7/2007 |
| WO | 2007082089 A2 | 7/2007 |
| WO | 2007/122498 | 11/2007 |
| WO | 2007/134075 | 11/2007 |
| WO | 2008/019079 | 2/2008 |
| WO | 2008019079 A2 | 2/2008 |
| WO | 2008/082312 | 7/2008 |
| WO | 2008/115076 | 9/2008 |
| WO | 2009/007200 | 1/2009 |
| WO | 2009/009388 | 1/2009 |
| WO | 2009/021258 | 2/2009 |
| WO | 2009/114309 | 9/2009 |
| WO | 2010/037011 | 4/2010 |
| WO | 2010/063923 | 6/2010 |
| WO | 2010/126617 | 11/2010 |
| WO | 2011/021161 | 2/2011 |
| WO | 2011/031752 | 3/2011 |
| WO | 2011/031755 | 3/2011 |
| WO | 2012/064712 | 5/2012 |
| WO | 2012/077978 | 6/2012 |
| WO | 2012/155054 | 11/2012 |
| WO | 2012/155059 | 11/2012 |
| WO | 2013/040645 | 3/2013 |
| WO | 2014/085243 | 6/2014 |

OTHER PUBLICATIONS

Annual Project Report as of Dec. 2001.
Cho et al., "Comparison of iron-, nickel-, copper- and manganese-based oxygen carriers for chemical-looping combustion," Fuel, 2004, vol. 83, Issue 9, pp. 1215-1225.
Environmental Protection Agency, "Geological CO2 Sequestration Technology and Cost Analysis," Technical Support Document, pp. i-vi & pp. 1-61, Jun. 2008.
Fan et al., "Utilization of chemical looping strategy in coal gasification processes," Particuology, 2008, vol. 6, Issue 3, pp. 131-142.
Garcia-Labiano et al., "Temperature variations in the oxygen carrier particles during their reduction and oxidation in a chemical-looping combustion system," Chemical Engineering Science, 2005, vol. 60, No. 3, pp. 851-862.
Geldart, "Types of Gas Fluidization," Power Technology, vol. 7, pp. 285-292, 1973.
Haque, "Microwave energy for mineral treatment processes—a brief review," International Journal of Mineral Processing, vol. 57, pp. 1-24, 1999.
Hawley's Condensed Chemical Dictionary, entry for "ammonium bisulfate," John Wiley & Sons, Inc., 2002.
Herzog, "Carbon Sequestration via Mineral Carbonation: Overview and Assessment," MIT Laboratory for Energy and the Environmental, http://sequestration.mit.edu/pfd/carbonates.pdf, Mar. 14, 2002.
Hildebrandt et al., "Producing Transportation Fuels with Less Work," Science, Mar. 27, 2009, vol. 323, pp. 1680-1681.
Hossain et al., "Chemical-looping combustion (CLC) for inherent CO2CO2 separations—a review," Chemical Engineering Science, 2008, vol. 63, Issue 18, pp. 4433-4451.
Huijgen et al., "Carbon dioxide sequestration by mineral carbonation," ECN-C--03-016, www.ecn.nl/docs/library/report/200e/c03016.pdf, Feb. 2003.
Jadhav et al., "Carbonation of Mg-Bearing Minerals: Kinetic and Mechanistic Studies," Ohio Coal Research Consortium/Ohio State University Project C3.12, www.ohiocoal.org/projects/year3/c3.12, Jul. 3, 2002.
Jin et al., "Development of a Novel Chemical-Looping Combustion: Synthesis of a Looping Material with a Double Metal Oxide of Co0-NiO," Energy & Fuels, 1998, vol. 12, 1272-1277.
Kaiser et al., "Precombustion and Postcombustion Decarbonization," IEEE, Power Engineering Review, Apr. 2001, pp. 15-17.
Li et al., "Clean coal conversion processes—progress and challenges," The Royal Society of Chemistry, Energy & Environmental Science, Jul. 30, 2008, vol. 1, pp. 248-267.
Mattisson et al., "Application of chemical-looping combustion with capture of CO2," Second Nordic Minisymposium on Carbon Dioxide Capture and Storage, Goeteborg, Oct. 26, 2001, pp. 46-51.
Mattisson et al., "Reactivity of Some Metal Oxides Supported on Alumina with Alternating Methane and Oxygen —Application for Chemical-Looping Combustion," Energy & Fuels, 2003, vol. 17, pp. 643-651.
Mattisson et al., "The use of iron oxide as an oxygen carrier in chemical-looping combustion of methane with inherent separation of CO2," Fuel, 2001, vol. 80, pp. 1953-1962.
Mattisson et al., "Use of Ores and Industrial Products As Oxygen Carriers in Chemical-Looping Combustion," Energy & Fuels, 2009, vol. 23, pp. 2307-2315.
Ockwig et al., "Membranes for Hydrogen Separation," American Chemical Society, Chem. Rev., Oct. 10, 2007, vol. 107, pp. 4078-4110.
O'Connor et al., "Carbon Dioxide Sequestration by Direct Mineral Carbonation: Results from Recent Studies and Currents Status," Abstract, USDOE Office of Fossil Energy, 2001.
Ohio Coal Development Office of the Ohio Air Quality Development Authority, "Ohio Coal Research Consortium (OCRC)—IV, Year 3 Proposal Solicitation," http://www.ohioquality.org/ocdo/other_pdf/Consortium_IV_Year_3_RFP.pdf (2006).
Park et al., "CO2 Mineral Sequestration: Chemically Enhanced Aqueous Carbonation of Serpentine," The Canadian Journal of Chemical Engineering, 2003, vol. 81, pp. 885-890.
Park et al., "CO2 Mineral Sequestration: physically activated dissolution of serpentine and pH swing process," Chemical Engineering Science, 2004, vol. 59, pp. 5241-5247.
Russo et al., "Impact of Process Design of on the Multiplicity Behavior of a Jacketed Exothermic CSTR," AICHE Journal, Jan. 1995, vol. 41, No. 1, pp. 135-147.

(56) References Cited

OTHER PUBLICATIONS

Shen et al., "Chemical-Looping Combustion of Biomass in a 10kWth Reactor with Iron Oxide as an Oxygen Carrier," Energy & Fuels, 2009, vol. 23, pp. 2498-2505.
Steinfeld et al., "Design Aspects of Solar Thermochemical Engineering—A case Study: Two-Step Water-Splitting Cycle Using the Fe3O4/FeO Redox System," Solar Energy, 1999, pp. 43-53.
Steinfeld, "Solar hydrogen production via a two-step water-splitting thermochemical cycle based on Zn/ZnO redox reactions," International Journal of Hydrogen Energy, 2002, vol. 27, pp. 611-619.
U.S. Department of Energy, NCCTI Energy Technologies Group, Office of Fossil Energy, "CO2 Capture and Storage in Geologic Formations," pp. 34, Revised Jan. 8, 2002.
Vernon et al., "Partial Oxidation of Methane to Synthesis Gas," Catalysis Letters, 1990, vol. 6, p. 181-186.
International Preliminary Report on Patentability for International Application PCT/US/2007/000956 dated Jul. 24, 2008.
International Search Report and Written Opinion for Application No. PCT/US14/14877 dated May 14, 2014 (10 pages).
International Search Report and Written Opinion for Application No. PCT/US14/25520 dated Jul. 11, 2014 (13 pages).
International Search Report and Written Opinion for Application No. PCT/US14/26071 dated Jul. 10, 2014 (9 pages).
International Search Report and Written Opinion for Application No. PCT/US2009/058579 dated Aug. 3, 2010.
International Search Report and Written Opinion for Application No. PCT/US2010/048121 dated Apr. 1, 2011.
International Preliminary Report on Patentability for International Application PCT/US/2010/048121 dated Mar. 22, 2012.
International Search Report and Written Opinion for Application No. PCT/US2010/048125 dated Dec. 17, 2010.
International Preliminary Report on Patentability for International Application PCT/US/2010/048125 dated Mar. 22, 2012.
International Search Report and Written Opinion for Application No. PCT/US2011/059736 dated Mar. 27, 2012.
International Preliminary Report on Patentability for International Application PCT/US/2011/059736 dated May 23, 2013.
International Search Report and Written Opinion for Application No. PCT/US2012/037544 dated Aug. 10, 2012.
International Preliminary Report on Patentability for International Application PCT/US/2012/037544 dated Nov. 12, 2013.
International Search Report and Written Opinion for Application No. PCT/US2012/037557 dated Aug. 13, 2012.
International Preliminary Report on Patentability for International Application PCT/US/2012/037557 dated Nov. 21, 2013.
International Search Report and Written Opinion for Application No. PCT/US2014/027839 dated Jul. 24, 2014 (9 pages).
International Search Report and Written Opinion for Application No. PCT/US2014/028217 dated Jul. 28, 2014 (8 pages).
International Search Report and Written Opinion for Application No. PCT/US2015/018123 dated May 8, 2015 (10 pages).
Canadian Patent Office Action for Application No. 2,737,946 dated Jul. 10, 2015 (4 pages).
Chinese Patent Office Action for Application No. 200980141285.8 dated May 5, 2014 (8 pages, English translation included).
Chinese Patent Office Action for Application No. 200980141285.8 dated Dec. 31, 2014 (3 pages, English translation only).
Chinese Patent Office Action for Application No. 200980141285.8 dated Mar. 18, 2015 (3 pages, English translation only).
European Search Report for Application No. 07716591.8 dated Mar. 6, 2012.
European Supplementary Search Report dated Feb. 27, 2012 pertaining to EP07716591.
European Patent Office Extended Search Report for Application No. 12782066.0 dated Sep. 24, 2014 (7 pages).
European Patent Office Action for Application No. 10760504.0 dated Dec. 9, 2013 (7 pages).
European Patent Office Action for Application No. 10760504.0 dated Feb. 2, 2015 (5 pages).
European Patent Office Action for Application No. 10760503.2 dated Dec. 9, 2013 (6 pages).
Taiwanese Patent Office Action for Application No. 103121110 dated Aug. 27, 2015 (5 pages, English translation included).
Office Action pertaining to U.S. Appl. No. 12/160,803 dated Jun. 7, 2011.
Final Rejection pertaining to U.S. Appl. No. 12/160,803 dated Jan. 5, 2012.
Office Action pertaining to U.S. Appl. No. 12/160,803 dated Jun. 5, 2012.
Final Rejection pertaining to U.S. Appl. No. 12/160,803 dated Mar. 22, 2013.
Advisory Action pertaining to U.S. Appl. No. 12/160,803 dated Jul. 11, 2013.
Examiner's Answer before the Patent Trial and Appeal Board for U.S. Appl. No. 12/160,803 dated Nov. 4, 2013.
Office Action pertaining to U.S. Appl. No. 13/121,009 dated Sep. 6, 2012.
Final Rejection pertaining to U.S. Appl. No. 13/121,009 dated Mar. 14, 2013.
Advisory Action pertaining to U.S. Appl. No. 13/121,009 dated Jun. 24, 2013.
Office Action pertaining to U.S. Appl. No. 13/121,009 dated Sep. 13, 2013.
Final Rejection pertaining to U.S. Appl. No. 13/121,009 dated Jan. 16, 2014.
United States Patent Office Action for U.S. Appl. No. 13/394,572 dated Apr. 9, 2014 (26 pages).
United States Patent Office Action for U.S. Appl. No. 13/394,572 dated Aug. 26, 2014 (16 pages).
United States Patent Office Action for U.S. Appl. No. 13/394,572 dated Dec. 30, 2014 (19 pages).
United States Patent Office Action for U.S. Appl. No. 13/394,396 dated Dec. 18, 2014 (14 pages).
United States Patent Office Final Rejection for U.S. Appl. No. 13/394,396 dated Jul. 2, 2015 (15 pages).
United States Patent Office Action for U.S. Appl. No. 14/091,654 dated Oct. 30, 2014 (14 pages).
United States Patent Office Action for U.S. Appl. No. 14/091,654 dated Jun. 12, 2015 (16 pages).
Abad et al., "Chemical-looping combustion in a 300 W continuously operating reactor system using a manganese-based oxygen carrier," Fuel, 2006, vol. 85, Issue 9, pp. 1174-1185.
Abad et al., "Reduction Kinetics of Cu-, Ni-, and Fe- Based Oxygen Carriers Using Syngas (CO + H2) for Chemical-Looping Combustion," Energy Fuels, 2007, 21 (4), pp. 1843-1853.
Abada et al., "The use of iron oxide as oxygen carrier in a chemical-looping reactor," Fuel, 2007, vol. 86, Issues 7-8, pp. 1021-1035.
Adanez et al., "Progress in Chemical-Looping Combustion and Reforming technologies," Progress in Energy and Combustion Science, 2012, vol. 38, Issue 2, pp. 215-282.
Azis et al., "On the evaluation of synthetic and natural ilmenite using syngas as fuel in chemical-looping combustion (CLC)," Chemical Engineering Research and Design, 2010, vol. 88, Issue 11, pp. 1505-1514.
Balasubramanian et al., "Hydrogen from methane in a single-step process," Chem Engr Science, 1999, 54(15-16), 3543.
Cao et al., "Investigation of Chemical Looping Combustion by Solid Fuels. 1. Process Analysis," Energy Fuels, 2006, 20(5), pp. 1836-1844.
De Diegoa et al., "Development of Cu-based oxygen carriers for chemical-looping combustion," Fuel, 2004, vol. 83, Issue 13, pp. 1749-1757.
Fan et al., "Chemical looping processes for CO2 capture and carbonaceous fuel conversion prospect and opportunity," Energy Environmental Science, 2012, p. 7254-7280.
Forero et al., "Syngas combustion in a 500 Wth Chemical-Looping Combustion system using an impregnated Cu-based oxygen carrier," Fuel Processing Technology, 2009, vol. 90, Issue 12, pp. 1471-1479.
Ghanapragasam et al., "Hydrogen production from coal direct chemical looping and syngas chemical looping combustion systems:

(56) References Cited

OTHER PUBLICATIONS

Assessment of system operation and resource requirements," International Journal of Hydrogen Energy, 2009, vol. 34, Issue 6, pp. 2606-2615.

Go et al., "Hydrogen production from two-step steam methane reforming in a fluidized bed reactor," International Journal of Hydrogen Energy, 2009, vol. 34, p. 1301-1309.

Gao et al., "Production of syngas via autothermal reforming of methane in a fluidized-bed reactor over the combined $CeO_2$—$ZrO_2/SiO_2$ supported Ni catalysts," International Journal of Hydrogen Energy, 2008, vol. 33, p. 5493-5500.

Hua et al., "Three Dimensional Analysis of Electrical Capacitance Tomography Sensing Fields," 1999 IOP Publishing Ltd, vol. 10, pp. 717-725.

Johansson et al., "Combustion of Syngas and Natural Gas in a 300 W Chemical-Looping Combustor," Chemical Engineering Research and Design Volume, 2006, vol. 84, Issue 9, pp. 819-827.

Leion et al., "Solid fuels in chemical-looping combustion using oxide scale and unprocessed iron ore as oxygen carriers," Fuel, 2009, vol. 88, Issue 10, pp. 1945-1954.

Leion et al., "Solid fuels in chemical-looping combustion," International Journal of Greenhouse Gas Control, 2008, vol. 2, Issue 2, pp. 180-193.

Leion et al., "The use of petroleum coke as fuel in chemical-looping combustion," Fuel, 2007, vol. 86, Issue 12-13, pp. 1947-1958.

Li et al., "Role of Metal Oxide Support in Redox Reactions of Iron Oxide for Chemical Looping Applications: Experiments and Density Functional Theory Calculations," Energy Environmental Science, 2011, vol. 4, p. 3661-3667.

Li et al., "Syngas chemical looping gasification process: Bench-scale studies and reactor simulations," AICHE Journal, 2010, vol. 56, Issue 8, pp. 2186-2199.

Li et al., "Syngas Chemical Looping Gasification Process: Oxygen Carrier Particle Selection and Performance," Energy Fuels, 2009, 23(8), pp. 4182-4189.

Lyngfelt, "Chemical Looping Combustion—Status of Development," 9th Int'l conference on Circulating Fluidized Beds, 2008, 1869-1873.

Lyngfelt, "Oxygen Carriers for Chemical Looping Combustion -4000 h of Operational Experience," Oil Gas Sci. Technol.—Rev. IFP Energies nouvelles, 2011, vol. 66, No. 2.

Mamman et al., "Simultaneous steam and $CO_2$ reforming of methane to syngas over NiO/MgO/SA-5205 in presence and absence of oxygen," Applied Catalysis A, 1998, vol. 168, p. 33-46.

Marashdeh, Q. et al., "A Multimodal Tomography System Based on ECT Sensors," IEEE Sensors Journal, vol. 7, No. 3, 2007, 426-433.

Marashdeh, Q., Advances in Electrical Capacitance Tomography, Dissertation, The Ohio State University, 2006.

Mattisson et al., "$CO_2$ capture from coal combustion using chemical-looping combustion—Reactivity investigation of Fe, Ni and Mn based oxygen carriers using syngas," Department of Energy and Environment, Division of Energy Technology and Department of Chemical and Biological Engineering, Division of Environmental Inorganic Chemistry, Chalmers University of Technology, 2007.

Mattissona et al., "Chemical-looping combustion using syngas as fuel," International Journal of Greenhouse Gas control, 2007, vol. 1, Issue 2, pp. 158-169.

Ortiz et al., "Hydrogen Production by Auto-Thermal Chemical-Looping Reforming in A Pressurized Fluidized Bed Reactor Using Ni-based Oxygen Carriers," International Journal of Hydrogen Energy, 2010, vol. 35, p. 151-160.

Osti, "Simultaneous Production of High-Purity Hydrogen and Sequestration-Ready $CO_2$ from Syngas," 2008.

Pröll et al., "Syngas and a separate nitrogen/argon stream via chemical looping reforming—A 140 kW pilot plant study," Fuel, 2010, vol. 89, Issue 6, pp. 1249-1256.

Proll et al., "Syngas and a separate nitrogen/argon stream via chemical looping reforming —A 140 kW pilot plant study," Fuel, 2010, vol. 89, p. 1249-1259.

Ruchenstein et al., "Carbon dioxide reforming of methane over nickel/alkaline earth metal oxide catalysts," Applied Catalysis A, 1995, vol. 133, p. 149-161.

Ryden et al., "Synthesis gas generation by chemical-looping reforming in a continuously operating laboratory reactor," Fuel, 2006, vol. 85, p. 1631-1641.

Scott et al., "In situ gasification of a solid fuel and $CO_2$ separation using chemical looping," AICHE Journal, 2006, vol. 52, Issue 9, pp. 3325-3328.

Shen et al., "Experiments on chemical looping combustion of coal with a NiO based oxygen carrier," Combustion and Flame, 2009, vol. 156, Issue 3, pp. 721-728.

Sridhar et al., "Syngas Chemical Looping Process: Design and Construction of a 25 kWth Subpilot Unit," Energy Fuels, 2012, 26(4), pp. 2292-2302.

Tian et al., "Thermodynamic investigation into carbon deposition and sulfur evolution in a Ca-based chemical-looping combustion system," Chemical Engineering Research & Design, 2011, vol. 89, Issue 9, p. 1524.

Usachev et al., "Conversion of Hydrocarbons to Synthesis Gas: Problems and Prospects," Petroleum Chemistry, 2011, vol. 51, p. 96-106.

Warsito, W. et al., Electrical Capacitance Volume Tomography, 2007, pp. 1-9.

Yamazaki et al., "Development of highly stable nickel catalyst for methane-steam reaction under low steam to carbon ratio," Applied Catalyst A, 1996, vol. 136, p. 49-56.

Zafar et al., "Integrated Hydrogen and Power Production with $CO_2$ Capture Using Chemical-Looping ReformingRedox Reactivity of Particles of CuO, $Mn_2O_3$, NiO, and $Fe_2O_3$ Using $SiO_2$ as a Support," Ind. Eng. Chem. Res., 2005, 44(10), pp. 3485-3496.

United States Patent Office Notice of Allowance for U.S. Appl. No. 13/394,572, dated Dec. 14, 2015 (10 pages).

European Patent Office Action for Application No. 09793053.1 dated Mar. 24, 2016 (5 pages).

\* cited by examiner

CONVERSION OF CARBONACEOUS FUELS INTO CARBON FREE ENERGY CARRIERS

CROSS-REFERENCE TO RELATED APPLICATIONS

This is a divisional of U.S. patent application Ser. No. 13/121,009, filed on Mar. 25, 2011, now U.S. Pat. No. 8,877, 147, issued on Nov. 4, 2014, which is a U.S. national phase entry of International Patent Application No. PCT/US2009/058579, filed on Sep. 28, 2009, which claims the benefit of U.S. Provisional Application No. 61/100,520, filed on Sep. 26, 2008, the entire contents of all of which are fully incorporated herein by reference.

The present invention is generally directed to systems and methods of converting carbonaceous fuels. Reduction-Oxidation (redox) reactions, with the presence of one or more chemical intermediates, are generally utilized to convert the carbonaceous fuels.

In order to meet the ever increasing demand for clean and affordable energy carriers and to ensure the sustainable growth of modern economy, efficient and environmentally friendly technologies that convert carbonaceous fuels such as coal, crude oil, natural gas, biomass, tar sands, and oil shale into carbon free energy carriers are highly desirable. An energy carrier is a substance or phenomenon that can be used to produce mechanical work or heat or to operate chemical or physical processes.

Existing carbonaceous fuel conversion technologies are either capital intensive (gasification or ultra-supercritical pulverized coal combustion), have low efficiencies (sub-critical pulverized coal combustion), or both, especially when $CO_2$ regulation is mandatory.

Chemical reactions between carbonaceous fuels and air/steam/$CO_2$ through the assistance of a metal oxide medium may represent an effective way to convert the fuels. A number of techniques have been proposed to convert carbonaceous fuels using metal oxide. For example, Watkins, U.S. Pat. No. 3,027,238, describes a method for producing hydrogen gas including reducing a metal oxide in a reducing zone, and oxidizing the reduced metal with steam to produce hydrogen in an oxidizing zone. Thomas et al., U.S. Published Application No. 2005/0175533, and Fan et al., PCT Application No. WO 2007/082089, both describe methods for producing hydrogen gas by reducing a metal oxide in a reduction reaction between a carbon-based fuel and a metal oxide to provide a reduced metal or metal oxide having a lower oxidation state, and oxidizing the reduced metal or metal oxide to produce hydrogen and a metal oxide having a higher oxidation state. The metal or metal oxide is provided in the form of a porous composite of a ceramic material containing the metal or metal oxide.

A well known process is a steam-iron process wherein coal-derived producer gas is reacted with iron oxide particles to be later regenerated with steam to produce hydrogen gas. However, a fluidized bed is used in this system which causes iron (Fe) to loop between FeO and $Fe_3O_4$, the gas is not fully converted, and no pure gas stream can be produced. Ishida et al., U.S. Pat. No. 5,447,024, describes processes that make use of nickel oxide particles to convert natural gas through a chemical looping process into heat to be used in a turbine. However, this technology has limited applicability because it can only convert costly natural gas into heat/electricity. Therefore, both the feedstock and the product of the process are restricted.

With increasing demand for cleaner and more efficient energy carriers such as electricity, hydrogen, and fuels, the need arises for improved systems, and system components therein, which produce the aforementioned energy carriers with higher efficiency and lower emissions.

Embodiments of the present invention provide novel systems and processes for converting solid, liquid, and gaseous fuels into efficient energy carriers. In one embodiment, a system for converting solid, liquid, or gaseous fuel is provided and comprises a first reactor comprising a plurality of ceramic composite particles. The ceramic composite particles comprise at least one metal oxide disposed on a support, and the first reactor is configured to reduce the at least one metal oxide with a fuel to produce a reduced metal or a reduced metal oxide. The system includes a second reactor configured to at least partially re-oxidize the reduced metal or reduced metal oxide to produce a metal oxide intermediate. The system also includes a source of air and a third reactor communicating with the source of air and configured to regenerate the at least one metal oxide by oxidizing the metal oxide intermediate. In a preferred form, the fuel is a solid fuel or a gaseous fuel. Optionally, a fuel conversion enhancement gas, preferably including $CO_2$, steam, and/or $H_2$, is sent to the first reactor in which the gas flows countercurrently to the flow of solids.

Also provided is a method of preparing ceramic composite particles, for example in the form of pellets, comprising the steps of, mixing a metal oxide with at least one ceramic material to form a mixture, granulating the mixture, and drying the granulated mixture. The dried, granulated mixture is processed into particle form such that the characteristic length of the particles is greater than about 200 μm. The particles are heat treated at a temperature of from about 500 to about 1500° C. and optionally may be reduced and oxidized prior to use in the reactor system.

Additional features and advantages provided by embodiments of the subject matter described herein will be more fully understood in view of the following detailed description, the accompanying drawings, and the appended claims.

The following detailed description of the illustrative embodiments of the subject matter described herein can be best understood when read in conjunction with the following drawings, where like structure is indicated with like reference numerals and in which.

Figure 1:
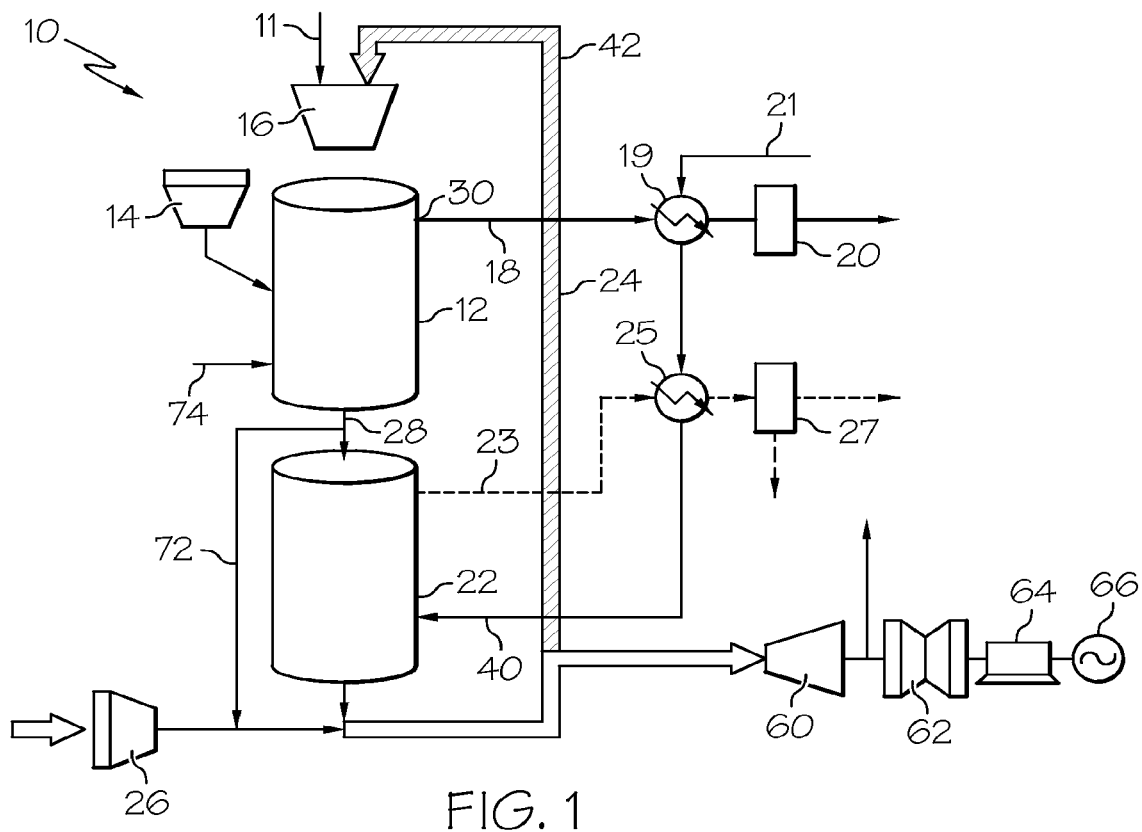
FIG. 1 is a schematic illustration of one embodiment in which a system for producing hydrogen and/or electricity from coal and/or biomass without the need for an Air Separation Unit (ASU) is provided.
Figure 8:
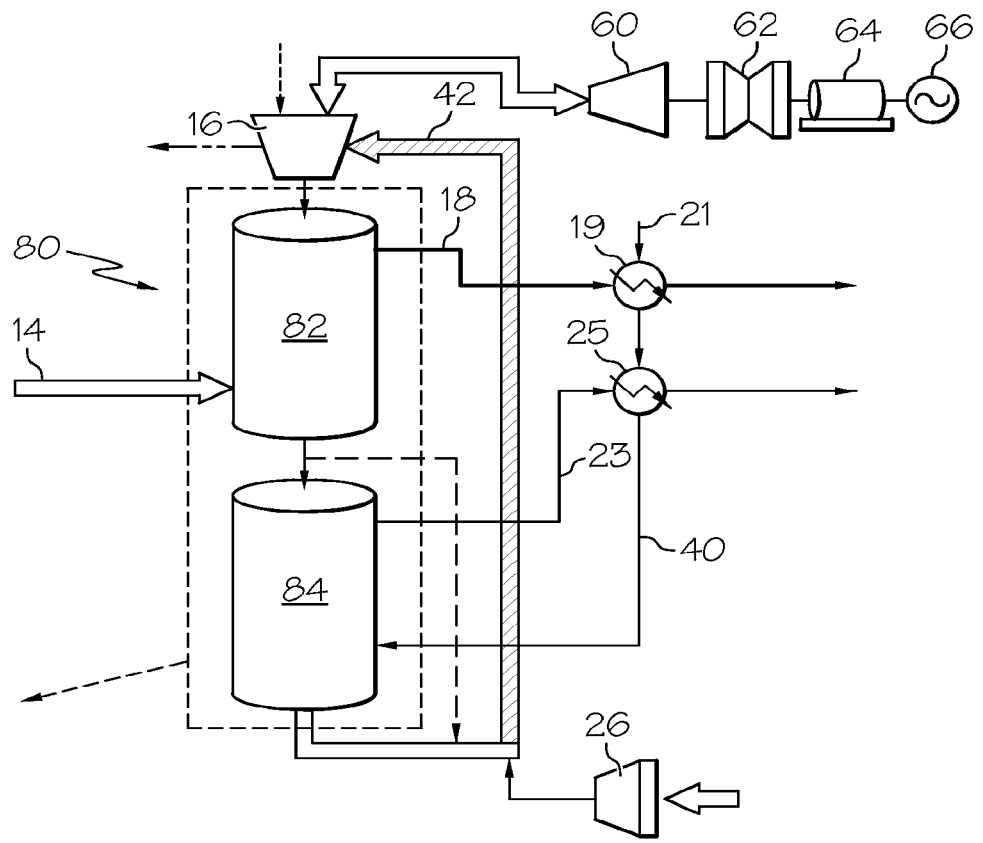
FIG. 8 is a schematic illustration of a system that converts gaseous fuels such as syngas, methane, and other hydrocarbons, into hydrogen and/or electricity.

Referring generally to FIGS. 1 and 8, embodiments of the subject matter described herein are directed to systems and methods for converting carbonaceous fuels by the redox reaction of metal oxide ceramic composites into carbon-free energy carriers such as hydrogen, heat, and electricity. FIG. 1 illustrates one embodiment of a system configuration when solid carbonaceous fuels are used directly as the feedstock, while FIG. 8 illustrates one embodiment of a system configuration when gaseous carbonaceous fuels are used as the feedstock.

In the embodiment illustrated in FIG. 1, system 10 includes a first reactor 12, also termed the reducer herein, which is configured to oxidize solid carbonaceous fuel from fuel source 14 into $CO_2$ and steam while reducing the metal oxide based ceramic composite particles which act as the oxygen carrier in the system. The solid fuel may be supplied by entraining it a flow of gas such as an oxygen-containing gas. As shown, a supply of metal oxide composite particles is stored in vessel 16 and supplied to reducer 12 as needed. Additional composite particles may be added as needed via conduit 11 as shown in FIG. 1. The heat required or generated in reducer 12 is provided or removed, at least partially, by the metal oxide oxygen carrier particles. The combustion products of the fuel, $CO_2$ and steam, are removed from reducer 12 through line 18. As shown, the steam is condensed by passing the gaseous stream through a heat exchanger 19 which is fed with a coolant such as water from line 21. The $CO_2$ stream, after optional removal of contaminants such as mercury in separator 20, is sent for sequestration. Typically, a relatively pure (i.e., >95%) $CO_2$ stream is produced from the reducer 12.

The second reactor 22, also termed the oxidizer herein, is configured to (partially) oxidize a portion or all of the reduced metal oxide oxygen carrier particles with either steam and/or $CO_2$ and to produce a stream of substantially pure hydrogen. The hydrogen is removed from oxidizer 22 through line 23. As shown, the hot hydrogen stream may be used to heat incoming steam in line 40 using heat exchanger 25. Any contaminants, such a hydrogen sulfide gas, in the hydrogen stream may be removed through separator 27. The hydrogen gas may be used, for example, for electric power generation, liquid fuel synthesis, or other uses. The third reactor 24, also termed the combustor herein, combusts the partially oxidized metal oxide oxygen carrier particles from oxidizer 22 and the remaining reduced metal oxide oxygen carrier particles from reducer 12 using an oxygen containing gas such as air supplied, for example, via line 26 through optional compressor 28. In the case when reducer 12 requires additional heat, at least part of the heat generated from combustor 24 is integrated to the reducer. In some cases, an air separation unit (not shown) can be used to separate oxygen from air and send the oxygen into the reducer to partially combust the fuel and to provide additional heat to the reducer 12. However, the capacity of such an air separation unit is much smaller than that used in a conventional gasification plant with identical fuel processing capacity. Therefore, one advantage of the system and process illustrated in FIG. 1 is that it can reduce the size of the air separation unit or eliminate the need for the air separation unit which separates oxygen from air. This reduces the capital cost of building and operating the fuel conversion system and enhances the overall efficiency of the system. In preferred embodiments, the air separation unit is completely avoided. Although the system illustrated in FIG. 1 depicts solid fuel conversion, gaseous fuel and liquid fuel can also be converted using this system. The operating pressure in the combustor 24 can either be comparable to the pressures in the reducer and oxidizer, or may be different. In the former case, non-mechanical based solids and gas flow control devices can be conveniently used to connect the reactors. In the latter case, mechanical valves should be used. However, the combustor can be operated at lower pressures, resulting in reduced combustor energy consumption. Moreover, heat can be extracted from the solids discharged from the reducer so that the oxidizer is operated at temperatures significantly lower than those of the reducer. By doing this, the steam to hydrogen conversion is enhanced.

As shown in FIG. 1, hot spent air from combustor 24 can be optionally sent to an expander 60 coupled to a turbine 62 and a generator 64 and used to generate electricity 66. Exhaust gas from the expander may be sent to separation equipment for the removal of contaminants such as sulfur oxides and nitrogen oxides.

Additional heat can be produced by means of: i) introducing a smaller fraction of the reduced metal oxide oxygen carrier particles from reducer 12 into oxidizer 14, with the remaining reduced metal oxide oxygen carrier particles being directly introduced to combustor 24; or ii) introducing a substoichiometric amount of steam and/or $CO_2$ to oxidizer 22 so that the reduced metal oxide oxygen carrier particles are incompletely regenerated by the steam and/or $CO_2$.

The oxygen carrier comprises a plurality of ceramic composite particles having at least one metal oxide disposed on a ceramic support. Suitable ceramic composite particles for use in the system and process of the invention are described in Thomas U.S. Published Application No. 2005/0175533, and Fan et al., PCT Application No. WO 2007/082089. In addition to the particles and particle formula and synthesis methods described in Thomas, in a further embodiment described below, methods to improve the performance and strength of the ceramic composite particles have been developed.

The further embodiment includes the step of mixing a metal oxide with at least one ceramic support material in powder form followed by an optional granulation step with the addition of either water or a binding material such as starch, sodium silicate, and/or potassium silicate. A promoter material may be added in the mixing step before granulation.

The granulated powder is then dried at temperatures of between about 50°-500° C. in air or nitrogen to reduce the moisture content to below 10%. The granulated powder is then processed into pellets with a characteristic length larger than about 200 μm. The methods for converting granulated powders into pellets may include, but are not limited to, extrusion, granulation, and pressurization methods such as pelletization. The pressure used to produce the pellets ranges from about 0.1-25 MPa.

After the metal oxide containing ceramic composite particles are made, final treatment steps are carried out. The final treatment steps include sintering the particles at 500°-1500° C., followed by reducing the metal oxide in the particles with hydrogen and then oxidizing the particles with air for at least one reduction-oxidation cycle to stabilize the performance of the particles. It should be noted that spent powders resulting from attrition in the reactor system can be reprocessed and reactivated following this method.

The metal oxide component preferably comprises a metal selected from the group consisting of Fe, Cu, Ni, Sn, Co, Mn, In, and combinations thereof. The support material comprises at least one component selected from the group consisting of SiC, oxides of Al, Zr, Ti, Y, Si, La, Sr, Ba, and combinations thereof. These supports include naturally ores such as bentonite and sepiolite. The ceramic composite comprises at least about 10% by weight of the support material. In further embodiments, the particle comprises a promoter material. The promoter comprises a pure metal, a metal oxide, a metal sulfide, or combinations thereof. These metal based compounds comprise one or more elements from the group consisting of Li, Na, K, Rb, Cs, Be, Mg, Ca, Sr, Ba, B, P, V, Cr, Mn, Co, Cu, Zn, Ga, Mo, Rh, Pt, Pd, Ag, and Ru. The ceramic composite comprises up to about 20% by weight of the promoter material. In an exemplary embodiment of the ceramic composite, the metal oxide comprises $Fe_2O_3$ supported on a support which is a mixture of alumina ($Al_2O_3$) and Anatase ($TiO_2$).

Referring back to the reduction reaction taking place in reducer 12, the reducer utilizes solid carbonaceous fuel such as coal, tars, biomass, oil shale, oil sands, tar sand, wax, coke, and the like to reduce the least one metal oxide of the ceramic composite particles to produce a mixture of reduced metal and/or metal oxide. The fuel is preferably supplied in particulate form to the reducer. The possible reduction reactions include but not limit to:

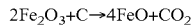
$2Fe_2O_3+C \rightarrow 4FeO+CO_2$

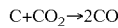
$C+CO_2 \rightarrow 2CO$

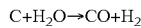
$C+H_2O \rightarrow CO+H_2$

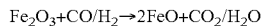
$Fe_2O_3+CO/H_2 \rightarrow 2FeO+CO_2/H_2O$

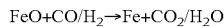
$FeO+CO/H_2 \rightarrow Fe+CO_2/H_2O$

Preferred designs of the reducer include a moving bed reactor with one or more stages, a multistage fluidized bed reactor, a step reactor, a rotary kiln, or any other suitable reactor or vessel known to those skilled in the art. In any of the reactor designs, a counter-current flow pattern between the metal oxide oxygen carrier solid particles and the gas is used to enhance the gas and solid conversion. The counter-current flow pattern minimizes the back-mixing of both the metal oxide composite oxygen carrier solids and gas. Moreover, the counter-current flow maintains the solids outlet 28 of the reducer 12 in a more reductive environment, while the gas outlet 30 of reducer 12 is maintained in a more oxidative environment. As a result, the gas and solid conversion are both enhanced based on thermodynamic principles.

Figure 16:
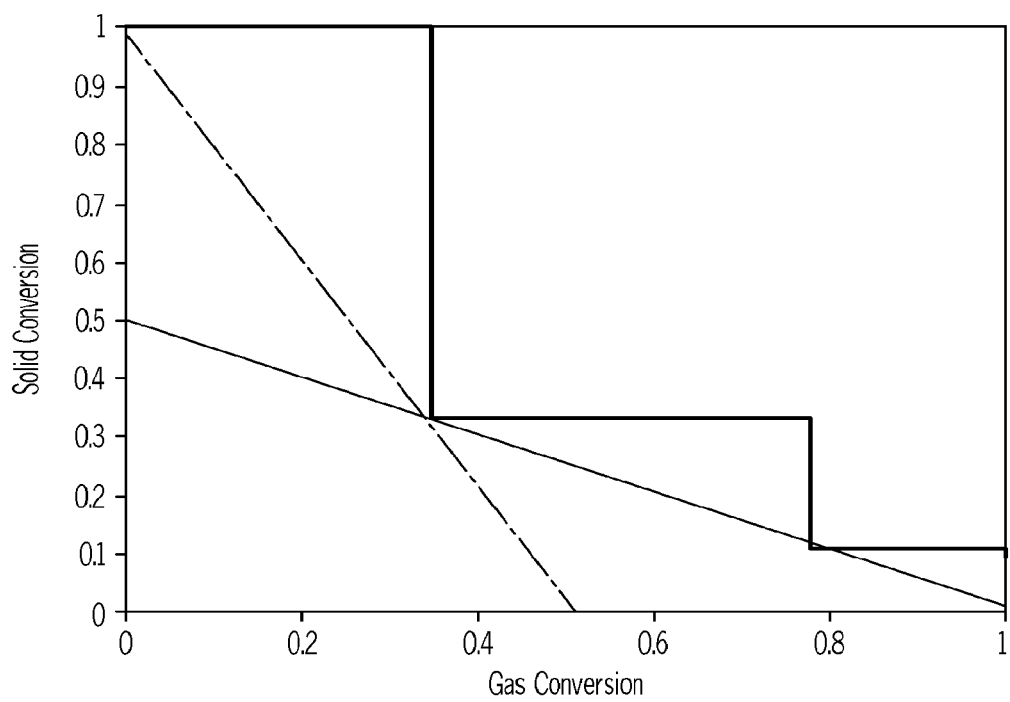
FIG. 16 is a graph illustrating the desired operating line of one embodiment of the reducer.

FIG. 16 exemplifies a preferred operating line of a reducer using syngas as the feedstock based on thermodynamic analysis. The preferred operating line (solid straight line) corresponds to full conversion (>99% conversion) of gaseous syngas fuel into $CO_2$ and steam while reducing the oxygen carrier particles, such as iron oxide containing composite particles, by nearly 50%. Similarly, a preferred operating mode when a solid fuel such as coal is used will lead to full conversion (>99% conversion) of coal into $CO_2$ and steam while reducing the iron oxide oxygen carrier composite particles by 33-85% depending on the ranking of the coal. Generally speaking, the operating conditions in the reducer are configured so that at least 95% of the carbonaceous fuel is converted to a gas stream with high $CO_2$ and steam concentration while reducing the iron oxide in the composite particles by 33%-85%. The preferred iron oxide reduction rate is about 36-85%. Preferably, the reduced iron oxide should have a metallic iron to Wuestite molar ratio of between about 1:25 to 3.55:1.

The conversion of carbonaceous fuel is defined as:

$$X_{gas} = n_{o\_consumed}/n_{o\_fullconversion}$$

$n_{o\_consumed}$ refers to number of moles of oxygen transferred to the fuel from the oxygen carrier in the reducer; $n_{o\_fullconversion}$ represents number of moles of oxygen required to convert the fuel fully into $CO_2$ and steam.

The conversion of iron oxide (or any type of metal oxide described above) is defined as:

$$y = \frac{\hat{n}_O/\hat{n}_{Fe} - n_O/n_{Fe}}{n_O/n_{Fe}} \times 100\%$$

Here, $n_O/n_{Fe}$ corresponds to the molar ratio between the oxygen and iron atoms in $Fe_2O_3$, while $\hat{n}_O/\hat{n}_{Fe}$ corresponds to the molar ratio between the oxygen and iron atoms in the reduced solid product, i.e. $FeO_x$ (0<x<1.5). For example, the reduction of $Fe_2O_3$ to $Fe_3O_4$ corresponds to a solid conversion of $(3/2-4/3)/(3/2) \times 100\% = 11.11\%$, FeO corresponds to a conversion of 33.33%, and Fe corresponds to 100% solid conversion. Definition of the conversion of other metal oxides follows a similar definition. A similar definition applies when other metals are used.

Figure 2A:
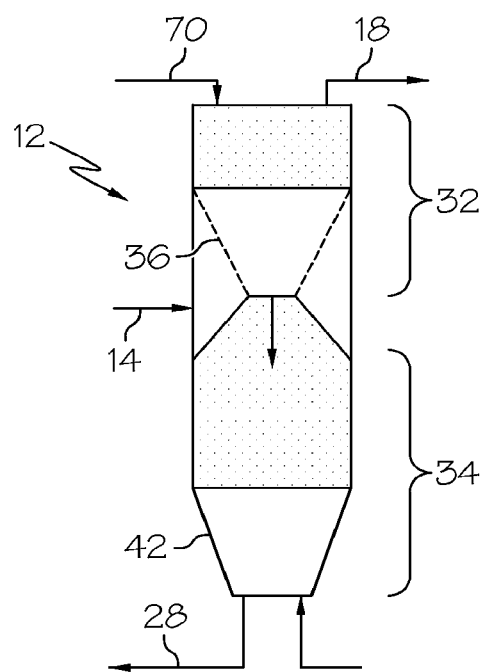
FIG. 2A is a schematic illustration of a reducer that converts coal and/or biomass into $CO_2$ and steam, while reducing $Fe_2O_3$ in the composite particles into Fe and FeO.

FIG. 2 illustrates a specific embodiment of a reducer 12 configured for solid carbonaceous fuel conversion. A two stage moving bed is provided. The upper stage 32 (first stage) converts the gaseous phase from the lower stage 34 (second stage) and volatiles from the solid fuel into $CO_2$ and steam, while the lower stage 34 converts the solid fuel such as pulverized (i.e., particulate) coal, coke biomass, or coal char which is fed into the reducer from line 14. The metal oxide particles which enter the first stage through line 70 as, for example, $Fe_2O_3$-containing particles, exit the second stage as a mixture of reduced metal (e.g., Fe) and metal oxide (e.g., FeO) through line 28. An oxygen-containing gas and, optionally a combustion enhancing gas such as $CO_2$, $H_2O$, or $H_2$, is fed into the bottom of the second stage through line 74; the hot combustion gases, $CO_2$ and steam, exit the top of the first stage through line 18. For example, when $Fe_2O_3$-containing particles are used as the oxygen carrier, the $Fe_2O_3$ conversion is between 20%-85%. The two stage design of the reducer allows good mixing of both solid-solid and solid-gas. Moreover, the solids movement can be achieved with ease. In certain embodiments, a portion of the pulverized solid fuel is entrained by the gaseous phase in the reducer. As a result, a portion of the solid fuel moves upwardly and is combusted in both the first and second stages. Thus, the height of the second reactor stage can either be significantly shorter or longer than the height of the first reactor stage depending on the physical and chemical properties of the fuel and the operating conditions in the reactor. Because of the flexibility in the reactor design, the point of injection of the solid fuel may be varied to any position between the reducer inlet and the reducer outlet.

Figure 2B:
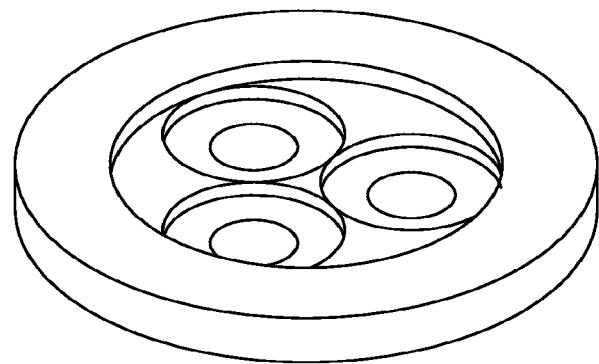
FIGS. 2B and 2C illustrate an alternative design for solid fuel injection and reactor outlet ports in the reducer.
Figure 2C:
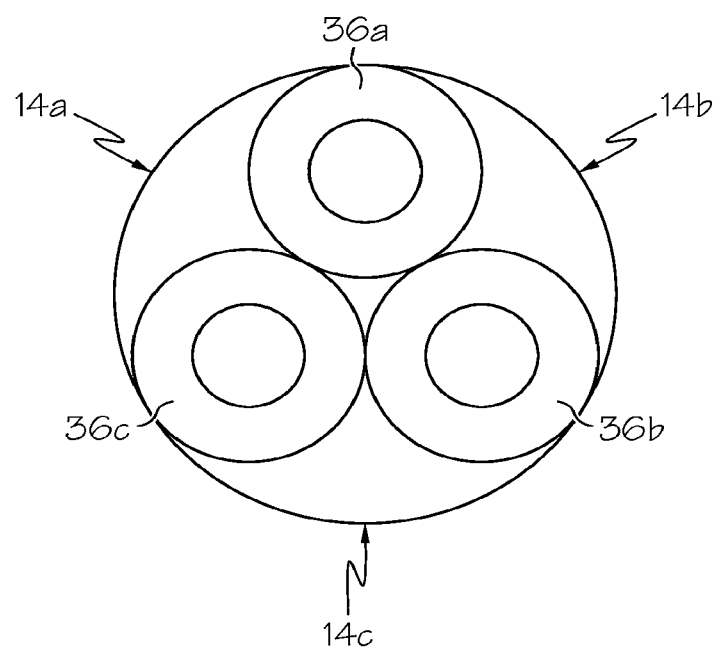

In certain embodiments, pulverized solid fuel, which is injected through line 14 into the reducer between the first and second reducer stages 32 and 34, is entrained by the gaseous phase in the reducer and flows counter-currently against the metal oxide oxygen carrier particulate solids. The solid fuels are converted to $CO_2$ and steam during the entrainment step. At least 95% of the fuel will be converted before exiting from the top of the first stage of the reducer 12. A portion of the ash can also be entrained and removed from the top of the first stage of the reducer. As shown in FIGS. 2B and 2C, the pulverized solid fuel may be injected into the reactor at multiple locations to better distribute the fuel in the reactor.

The reactions that take place in the first and second stages of reducer 12 include:

Particle reduction: $CH_4 + 4Fe_2O_3 \rightarrow CO_2 + 2H_2O + 8FeO$

Figure 3:
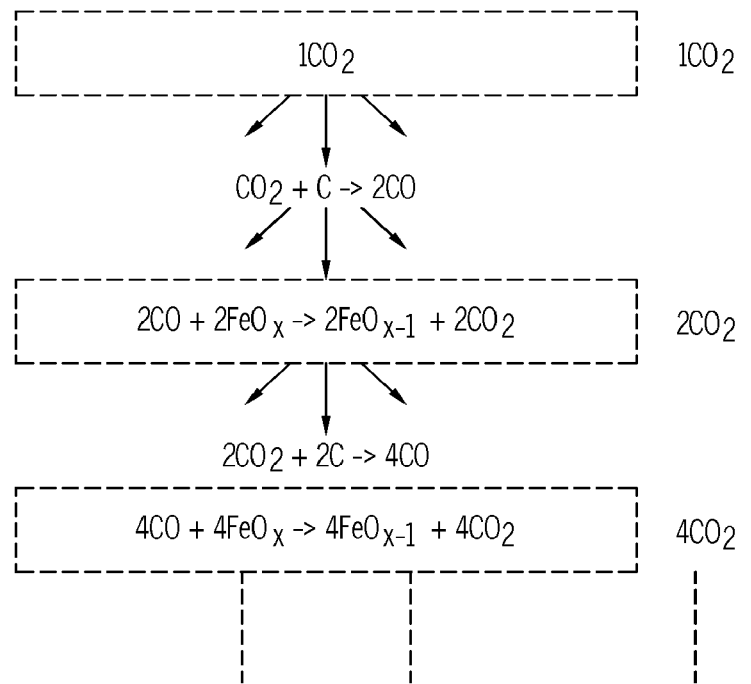
FIG. 3 is a schematic illustration of a coal char/biomass conversion enhancement scheme.

Coal devolatilization: coal → $C + CH_4$ $CO + FeO \rightarrow Fe + CO_2$ $C + CO_2 \rightarrow 2CO$ Char gasification and particle reduction:

$C + CO_2 \rightarrow 2CO$ $C + H_2O \rightarrow CO + H_2$ $CO + FeO \rightarrow Fe + CO_2$ $H_2 + FeO \rightarrow Fe + H_2O$ One of the issues related to conversion of solid fuel is the enhancement of solid fuel conversion. FIG. 3 illustrates a scheme to enhance the solid conversion by adding $CO_2$ to the bottom of the second reducer stage in FIG. 2. The addition of $CO_2$ initiates a "chain reaction" that gasifies carbon while reducing metal oxide. During this process, more $CO_2$, which acts as gasification enhancer, will be produced, resulting in further improved reaction rates. Other gasification enhancers include $H_2O$ and $H_2$. It should be noted that although injection of $CO_2$ and $H_2O$ may affect slightly the metal oxide conversion, they are still considered as feasible gasification enhancers since they are easily available in the fuel conversion system. One way to obtain such enhancers is to recycle part of the exhaust gas from the first stage of the reducer, which contains both $CO_2$ and steam, into the second reducer stage solids outlet (bottom). The aforementioned fuel conversion enhancement technique can also be applied for the conversion of gaseous/liquid carbonaceous fuels such as methane and higher hydrocarbons since CO and $H_2$ react with metal oxide faster than hydrocarbon or solid fuels.

Figure 4A:
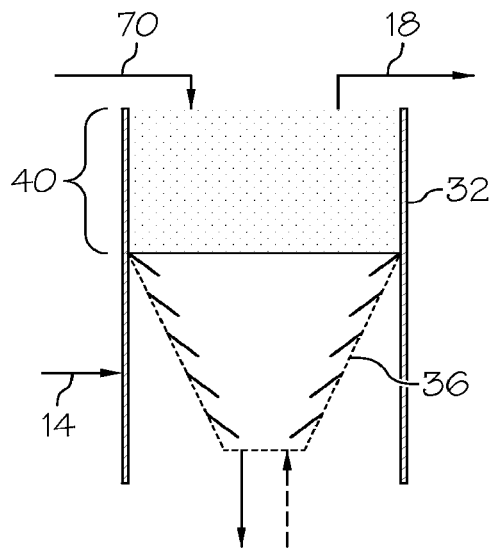
FIGS. 4A and 4B are schematic illustrations of gas solid flow patterns in the first and second stages of a reducer.
Figure 4B:
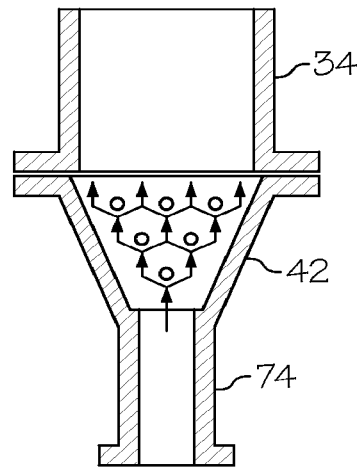

FIG. 4 further illustrates a preferred design of the solids outlet (bottom) of the first stage of the reducer as well as the solids outlet (bottom) of the second stage of the reducer. The first stage has a restricted flow outlet such as, for example, a funnel shaped outlet 36 with multiple blades 38 on the interior wall. Such a design allows gas to permeate from the top of the second stage to the first stage. Meanwhile, the metal oxide based ceramic composite particles will be discharged from outlet 36 in a controlled manner. A dune of solid particles is formed between the bottom of the first stage and the top of the second stage. Solid fuel is dispersed to the annular region 40 of the first stage and mixes well with the metal oxide based ceramic composite particles. The solids outlet 42 of the second stage also uses a restricted flow design such as a funnel shape. The funnel preferably has an angle of about 15-75°. Such an angle allows solids with different sizes to move downwardly at similar speeds, thereby avoiding small solids exiting the reducer at rates much faster than the larger solids. Moreover, the solids will act as a gas distributor to ensure good mixing between solid and gas. In certain embodiments, multiple funnel shaped solids outlets can be used, especially for the first stage outlet. FIG. 2, especially FIGS. 2B and 2C, illustrates one example of an outlet design in which three funnel shaped outlets 36a, 36b, and 36c are used with three solid fuel injection ports 14a, 14b, and 14c. This design provides a more homogenous solids distribution in the reactor. Other configurations of funnel shaped outlets and solid fuel injection ports can also be used.

The effective regulation of gas and solids flows between the reactors is important. Mechanical valves such as rotary valve or a ball valve-table feeder system can be used to control the solids and gas movements. Non-mechanical valves, loop seals, and/or zone seals can also be used to regulate the gas and solids flow. Several suitable non-mechanical gas sealing and solids flow control devices are schematically illustrated in FIGS. 20A-D. These devices can be installed between reactors or reactor stages to control the flow of materials between stages.

Figure 5:
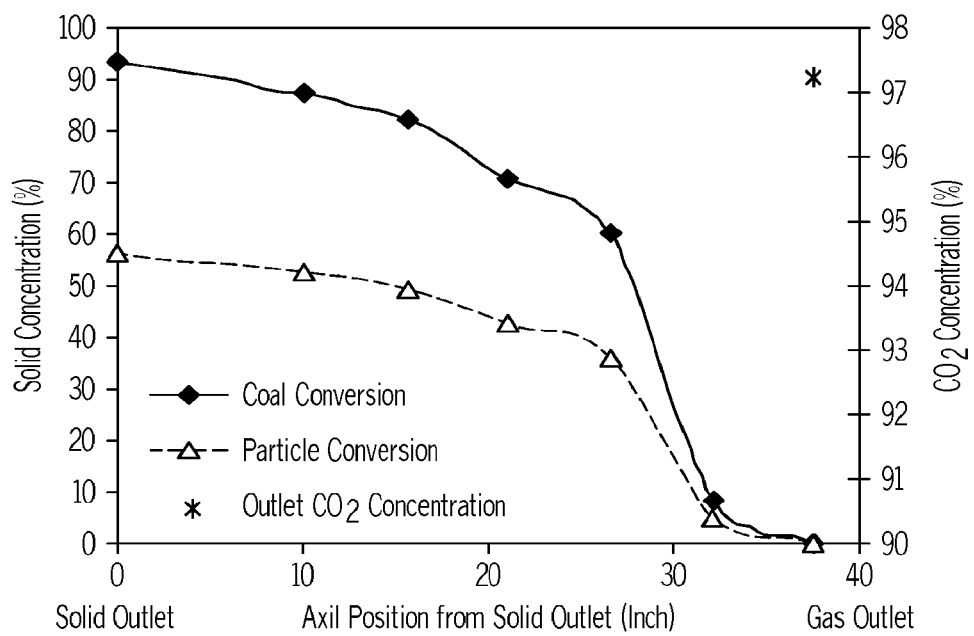
FIG. 5 is a chart showing the conversion of coal and an oxygen carrier in an embodiment of a moving bed reducer.

FIG. 5 further illustrates in chart form the conversion of an iron oxide based particulate oxygen carrier and coal obtained in a moving bed reducer. More detailed results are listed in Table 1 below.

TABLE 1

Summary of the Fuel Reactor demonstration results using coal, coal char, and volatile

| | Type of Fuel | | | |
|---|---|---|---|---|
| | Coal Volatile | Lignite Char | Bituminous Char | Anthracite Coal |
| Fuel Conversion (%) | 99.8 | 94.9-99.5 | 90.5 | 95.5 |
| $CO_2$ Concentration in Exhaust (% Dry Basis) | 98.8 | 99.23 | 99.8 | 97.3 |
| Gasification Enhancer | $H_2/CO_2$ | $CO_2/H_2O$ | $CO_2$ | $CO_2$ |

Generally speaking, solid fuel conversion of >90% with about 33%-85% metal oxide conversion can be obtained. The exhaust gas stream from the reducer has >95% $CO_2$ after condensing out steam.

Figure 17:
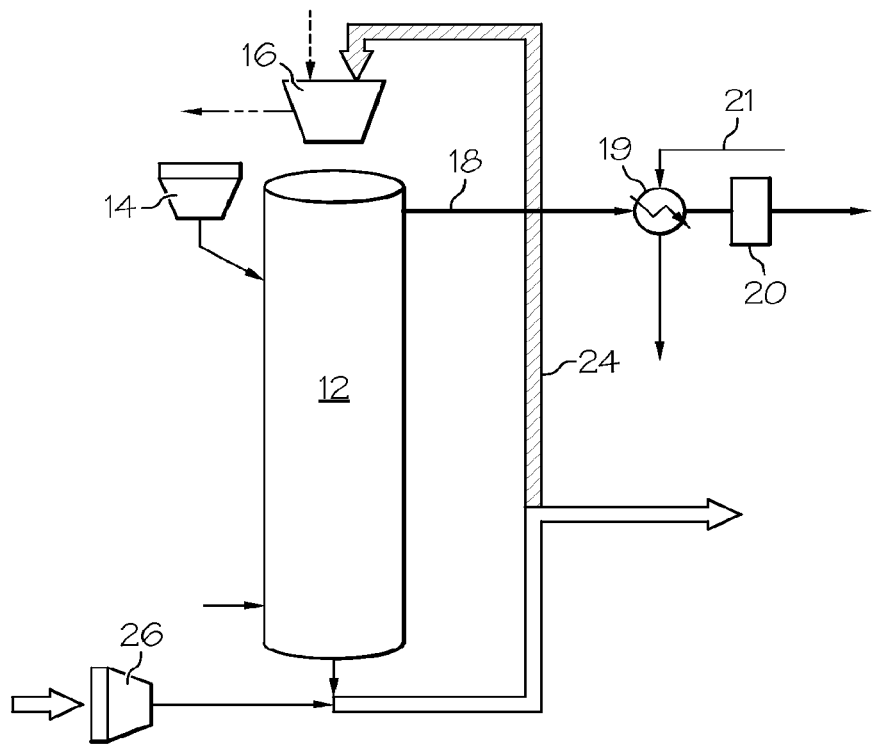
FIG. 17 is a schematic illustration of an embodiment for electricity generation from biomass.

Referring now to FIG. 17, where like reference numerals represent like elements, an embodiment for electricity generation from biomass is shown in schematic form. The configuration is similar to that shown in FIG. 1. In this embodiment, all of the reduced metal oxide particles are directly sent to the combustor 24. As a result, the oxidizer (not shown) is completely bypassed. A preferred configuration for the reducer of this embodiment is shown in FIG. 2. The hot gas stream generated from the system can be either used in a boiler/Heat Recovery Steam Generator (HRSG) or in a combined cycle system with an expander/gas turbine for power generation. Similarly, the combustor hot gas in the embodiment shown in FIG. 1 can also be used in a boiler/HRSG, although an expander is shown in FIG. 1 for illustrative purposes. The metals that can be used in the process shown in FIG. 1 include Fe, Ni, Cu, and Mn. When $Fe_2O_3$ is used, the preferred solid reduction rate is 11%-75% for power generation purposes. Table 2 shows experimental result obtained from biomass gasification:

TABLE 2

Experimental results obtained from pulverized woody biomass using $Fe_2O_3$ based ceramic composite and gasification enhancer ($CO_2$ and $H_2O$)

| $CO_2$ Concentration in the Reducer Exhaust (% dry basis) | Biomass Conversion (%) | Residence Time (Min) | Metal Oxide Reduction (%) |
|---|---|---|---|
| >95% | >99% | 20-120 | >20% |

In some cases the solid fuel may contain impurities such as ash, sulfur, and mercury. Ash in the solid fuel will exit the reducer along with the metal oxide based ceramic composite. Part of the sulfur will also exit the reducer in the form of metal-sulfur compounds such as FeS ($Fe_{0.877}S$) at high temperatures. The remainder of the sulfur exits the reducer in the form of $H_2S/SO_2$. The sulfur can be sequestrated along with $CO_2$ without the need for treatment. All the mercury will also exit the reducer along with exhaust gas stream. The mercury can either be removed using known techniques or be sequestered.

Referring back to FIG. 1, a portion of the solids exiting reducer 12 will enter second reactor 22 (the oxidizer). Preferred designs of the oxidizer include a moving bed reactor, a multistage fluidized bed reactor, a step reactor, a rotary kiln, or any other suitable reactor or vessel known to those skilled in the art. In any of the reactor designs, a counter-current flow pattern between oxygen carrier solid particles and gas is used to enhance the gas and solid conversion. The counter-current flow pattern minimizes the back-mixing of both oxygen carrier solid and gas. Moreover, the counter-current flow keeps the solids outlet of reactor 22 in a more oxidative environment while the gas outlet of reactor 22 is maintained in a more reductive environment. As a result, the gas and solid conversion are both enhanced.

Figure 19:
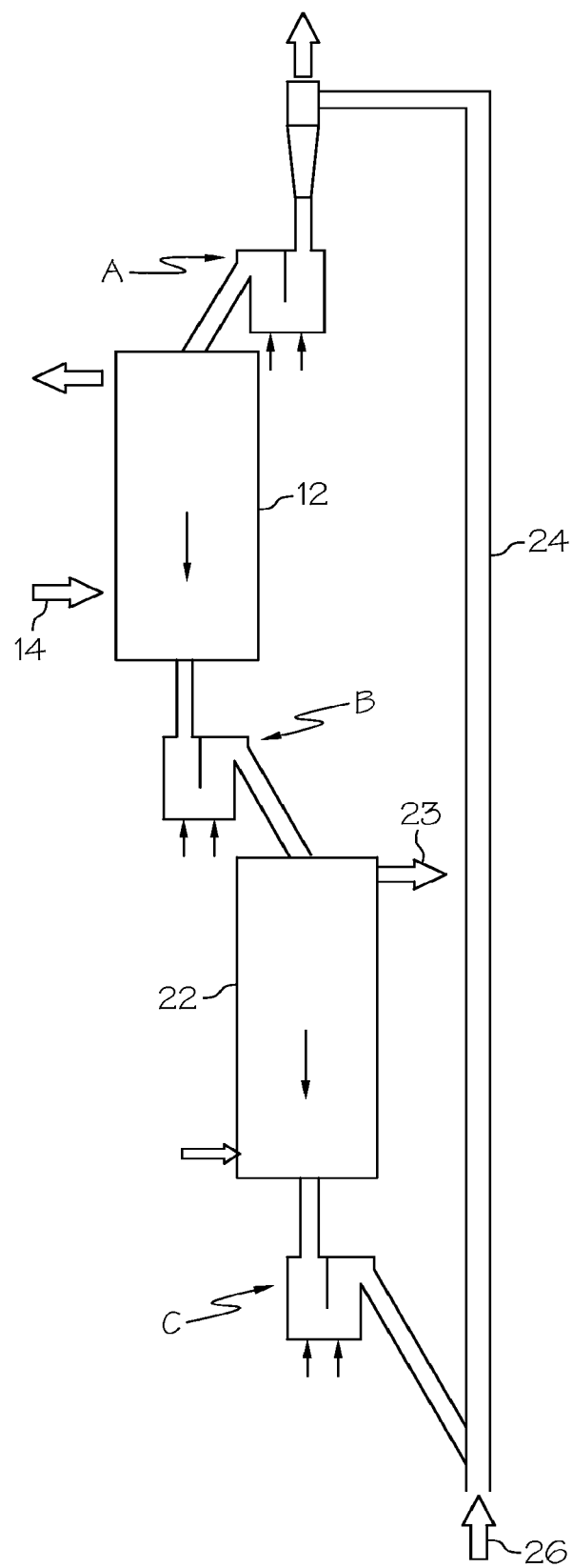
FIG. 19 is a schematic illustration of a design for the redox system using non-mechanical gas seals and solids flow control device.
Figure 20A:
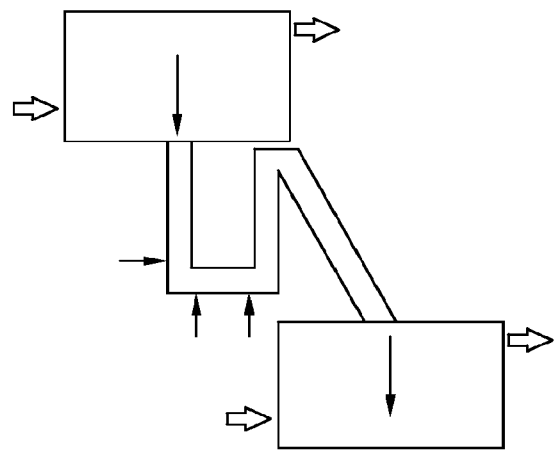
FIGS. 20A-D illustrates alternative designs for non-mechanical gas sealing and solids flow control.
Figure 20B:
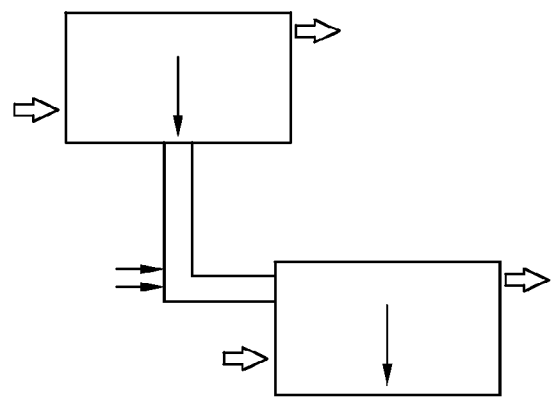
Figure 20C:
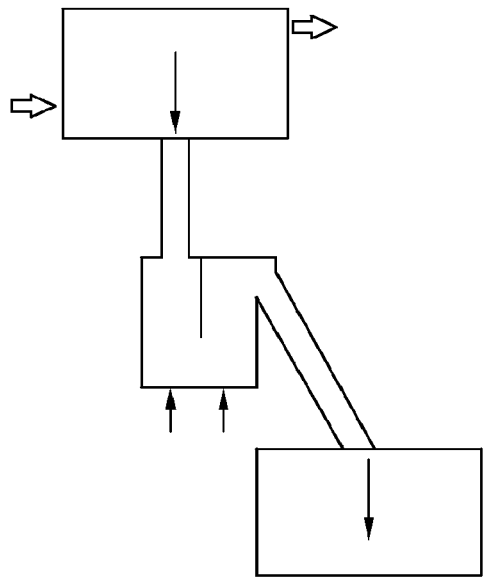
Figure 20D:
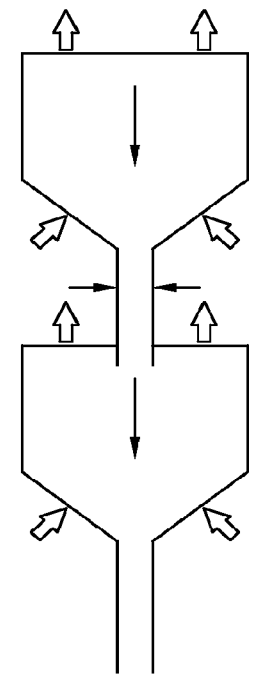

The connections between the reducer 12, oxidizer 22, and combustor 24 can be mechanical, i.e. a rotary valve or a lock hopper assembly. In another design, the reducer 12, oxidizer 22, and combustor 24 are directly connected using non-mechanical valves and gas seals such as those used in a circulating fluidized bed or a fluid catalytic cracker. The pressure differences in the reactor as well as a small amount of aeration gas prevent the leakage of the product gas from the oxidizer 22 into the reducer 12 or vice versa. Such a non-mechanical reactor design is illustrated in FIG. 19. Only one of the three connections ("A", "B", and "C" in FIG. 19) is used to control the overall solids circulation rate in the reactor system. Preferably, the connection between the oxidizer 22 and the combustor 24 (connection "C" in FIG. 19) is used to regulate the solids flow. Suitable non-mechanical valves for this connection between reactor stages include L-valves, J-valves, loop seals, or N-valves. Aeration gas used here can be steam and/or spent air. For the connection between the combustor 24 and reducer 12 (connection "A" in FIG. 19), a zone seal or loop seal can be used with $CO_2$ and/or spent air as the aeration gas. For the connection between the reducer 12 and oxidizer 22 (connection "B" in FIG. 19), a zone seal or loop seal can be used with $H_2$ and/or steam as the aeration gas. Preferred designs for the non-mechanical gas seal and solids valves are shown in FIG. 20A (N-valve), FIG. 20B (L-valve), FIG. 20C (loop seal), and FIG. 20D (standpipe and zone seal). Relatively smooth, funnel shaped reactor outlets are installed for both the reducer 12 and oxidizer 22 to ensure a smooth connection between the reactor (with large inner diameter) and the non-mechanical devices (with much smaller inner diameters). This reduces the usage of aeration gases. A particulate separation device (not shown) may also installed between the combustor 24 and reducer 12. The device is used to separate out the fines from the combustor exhaust gas. A preferred separation device has more than a two stages. The first stage separates out larger particulates (e.g., 20-200+ μm) from the fine powder and exhaust gas. The second stage separates out smaller fines from the exhaust gas. The fines may be reprocessed into larger particles/pellets.

The gaseous feedstock for oxidizer 22 can either be steam, $CO_2$, or a combination thereof and enters through line 40. When steam is used, the steam conversion of the oxidizer can be between about 50-99% depending on the oxidizer temperature and solid conversion in the reducer. When $Fe_2O_3$ based ceramic composite particles are used, an iron phase of at least 5% (by mole) is preferred in order to achieve optimum steam conversion. When $CO_2$ is used, the gas conversion (40-95%) is also dependant upon the temperature and solid conversion. When a mixture of $CO_2$ and steam is used, the oxidizer product stream can be condensed and partially recycled to reduce the $CO_2$ concentration in the final product stream and to improve the gas conversion.

The metal-sulfur compounds formed in reducer 12 will be partially regenerated in oxidizer 22, producing $H_2S$. Therefore, the product stream of the oxidizer is often contaminated with $H_2S$ up to 750 ppm. $H_2S$ can be removed via sorbent techniques, solvent techniques, or other traditional acid removal techniques. The ash in the metal oxide ceramic composite will not react in the oxidizer and will be discharged along with the partially regenerated metal oxide ceramic composite. When $Fe_2O_3$ based ceramic composite is used, the iron phase in the solid product from the oxidizer is predominantly $Fe_3O_4$ with some remaining metal-sulfur compounds. In certain embodiments, a sub-stoichiometric amount of steam/$CO_2$ is introduced to regenerate the reduced iron oxide to an oxidation state lower than $Fe_3O_4$, e.g. Fe/FeO mixture, FeO, or FeO/$Fe_3O_4$ mixture. By doing this, the heat that can be generated from the subsequent combustor will increase at the expense of reduced hydrogen/CO production in the oxidizer.

Referring back to FIG. 1, the partially regenerated metal oxide ceramic composite particles from the oxidizer are introduced to the third reactor 24 (the combustor) along with a portion of the reduced ceramic composite particles from the reducer 12. Preferred designs of the combustor 24 include a fast fluidized bed reactor, an entrained bed reactor, a transport bed reactor, or a mechanical conveying system. Optionally, to provide sufficient time for metal oxide ceramic composite regeneration, a two stage design may be adopted for the third reactor 24. With such a design, stage I of the third reactor, which is located at the bottom portion, is operated in a bubbling or turbulent fluidization regime to provide adequate solids and gas residence time. The diameter of stage I is typically larger than stage II when such a design is used.

The combustor 24 is used to substantially completely oxidize the metal oxide based ceramic composite back to its higher oxidation state. Air or other oxygen containing gas may be used in the combustor. The gaseous product from the combustor is an oxygen lean gas at a temperature much higher than the inlet gas temperature. The gaseous product may also contain $SO_2$ and $NO_x$. When $Fe_2O_3$ based ceramic composite is used, the iron phase in the solid product is predominantly $Fe_2O_3$. Ash will also come out along with the fine ceramic composite powders resulting from attrition. A portion of the ash may exit from the gaseous outlet of the reducer.

A significant amount of heat is generated in the combustor 24. In one configuration, the heat is carried away from the combustor by both the gaseous product and solid product. The solid product is directly injected back to the reducer 12 through line 42. As a result, the sensible heat carried in the solid product is used to compensate the heat required in the reducer 12. Moreover, the sensible heat contained in the exhaust gas can also be transferred to the reducer via heat exchange.

Ash and spent ceramic composite can be separated using mechanical methods such as a cyclone. Ash separation efficiency was demonstrated to be at least 75.8% with 15 seconds of mechanical separation, which corresponds to less than 1% ash content in the ceramic composite when bituminous coal is used as the solid fuel.

| Before Experiment | |
|---|---|
| Pellet (g) | Ash (g) |
| 2565.3 | 224.97681 |

| After Experiment | | | |
|---|---|---|---|
| Pellet (>2.8 mm) | | Particle (<2.8 mm) | |
| Pellet (g) | Ash (g) | Particle (g) | Ash (g) |
| 2444.2 | 54.4 | 121.1 | 170.5 |

Figure 6:
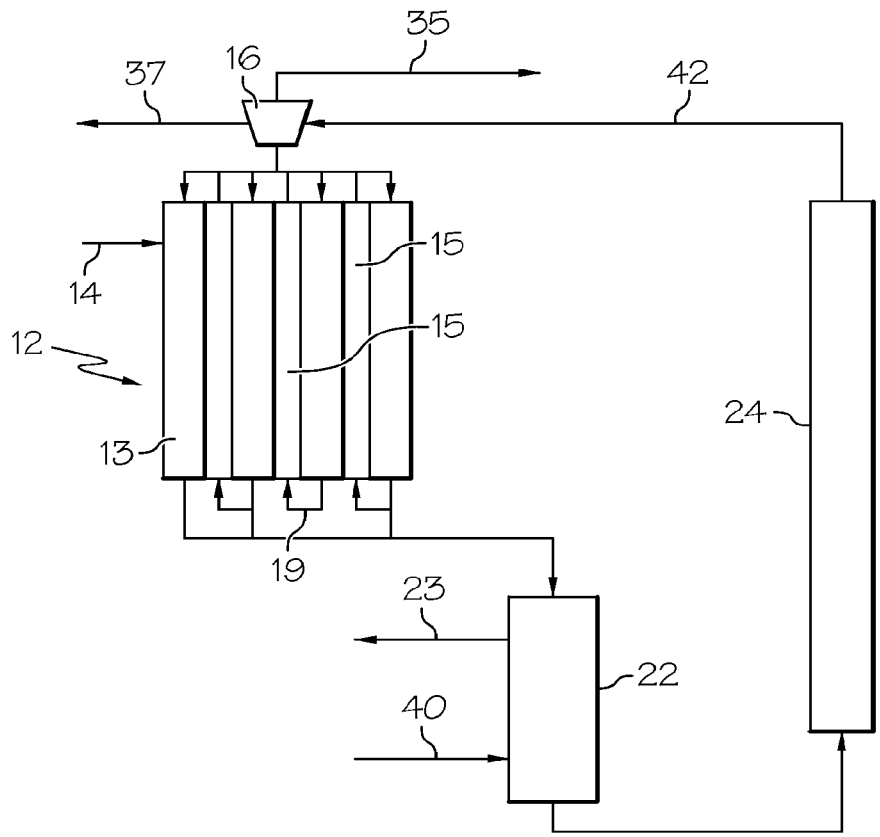
FIG. 6 is a schematic illustration of an alternative embodiment for a system that converts carbonaceous fuels into hydrogen, sequestrable $CO_2$, and heat.

Referring now to FIG. 6, FIG. 6 exemplifies an alternative configuration for a fuel conversion system. In this configuration, where like reference numerals represent like elements, the first reactor 12 integrates the function of both the reducer and the combustor (such as shown in the configuration in FIG. 1). The first reactor 12 has a shell side 13 and a tube side 15. Solid or gaseous carbonaceous fuel is introduced into shell side 13 through line 14, and ceramic composite particles, supplied from vessel 16, are converted (i.e., reduced) in the shell side as well. A portion of the reduced solids from the shell side is directly recycled back to the tube side through conduits 19 and combusted with air. The heat released in the combustion compensates for the heat required in the shell side. Moreover, the hot solids from the third reactor 24 (combustor) will also partially compensate for the heat required in the reducer 12. Steam and CO2 are supplied to oxidizer 22 through port 40, while the hydrogen stream is removed through line 23. Ceramic composite particles with regenerated metal oxide are sent from combustor 24 back to vessel 16. The heat from those particles may be captured and used for steam or power generation (indicated by line 35. ash and spent particles are removed via line 37.

Figure 7:
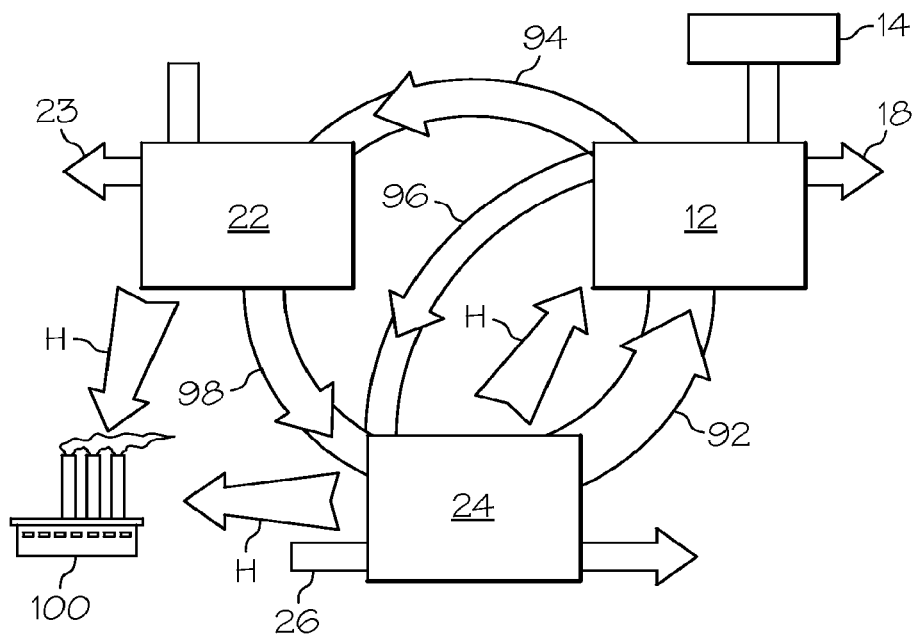
FIG. 7 illustrates a heat integration scheme for an embodiment of a carbonaceous fuel conversion system.

Referring now to FIG. 7, where like reference numerals indicate like elements, FIG. 7 illustrates a generalized heat integration scheme for the process. In such a scheme, heat generated in the combustor 24 is used to: 1) compensate for the heat requirements in the reducer 12, and 2) generate electricity for parasitic energy consumption. The goal of the heat integration is to minimize the excessive heat generated in the system, thereby maximizing the energy conversion from the fuel to the product. As shown, the metal oxide particles are reduced in reducer 12, with reduced particles sent via lines 94 and 96 to the oxidizer 22 and combustor 24. Oxidized particles 98 are sent from oxidizer 22 to combustor 24, while regenerated particles 92 are recycled back to reducer 12. The heat produced by the reactions, shown as arrows H, is used to supply any required heat to reducer 12 and for the production of steam or electric power (at 100).

Referring now to FIG. 8, where like reference numerals indicate like elements, FIG. 8 illustrates a generalized system that converts gaseous/liquid carbonaceous fuels. The liquid carbonaceous fuels may include gasoline, oil, petroleum, diesel, jet fuel, ethanol, and the like; and the gaseous carbonaceous fuels include syngas, methane, carbon monoxide, hydrogen, gaseous hydrocarbon gases (C1-C6), hydrocarbon vapors, and the like.

In the embodiment illustrated in FIG. 8, gaseous fuel such as syngas fuel or methane is converted, and the system can be divided into two reactors: a hydrogen generation reactor 80 and a combustor 86. The hydrogen generation reactor can be further divided into two stages: a reducer stage 82 and an oxidizer stage 84. Each stage in the hydrogen generation reactor can also be considered as a separate reactor.

Preferred designs of the hydrogen generation reactor include a moving bed reactor with one or more stages, a multistage fluidized bed reactor, a step reactor, a rotary kiln, or any suitable reactor or vessel known to those skilled in the art. In any of the reactor designs, a counter-current flow pattern between solid and gas is used to enhance the gas and solid conversion. The counter-current flow pattern minimizes the back-mixing of both solid and gas. Moreover, it improves the conversions of the gas and the solid thermodynamically. The residence time for solids typically ranges from about 15 minutes to about 4 hours. The reducer residence time typically ranges from about 7.5 minutes to about 2 hours, and the oxidizer residence time also typically ranges from about 7.5 minutes to about 2 hours.

In the reducer 82, gaseous fuel is introduced at or near the bottom of the reducer and then moves countercurrently relative to the ceramic composite particles. When syngas is used as the fuel, the possible reactions include:

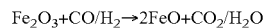

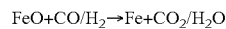

When natural gas or other methane rich gas is used as fuel, the possible reactions include:

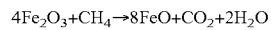

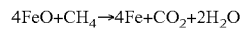

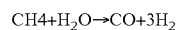

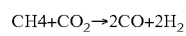

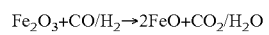

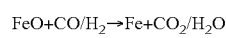

Figure 18:
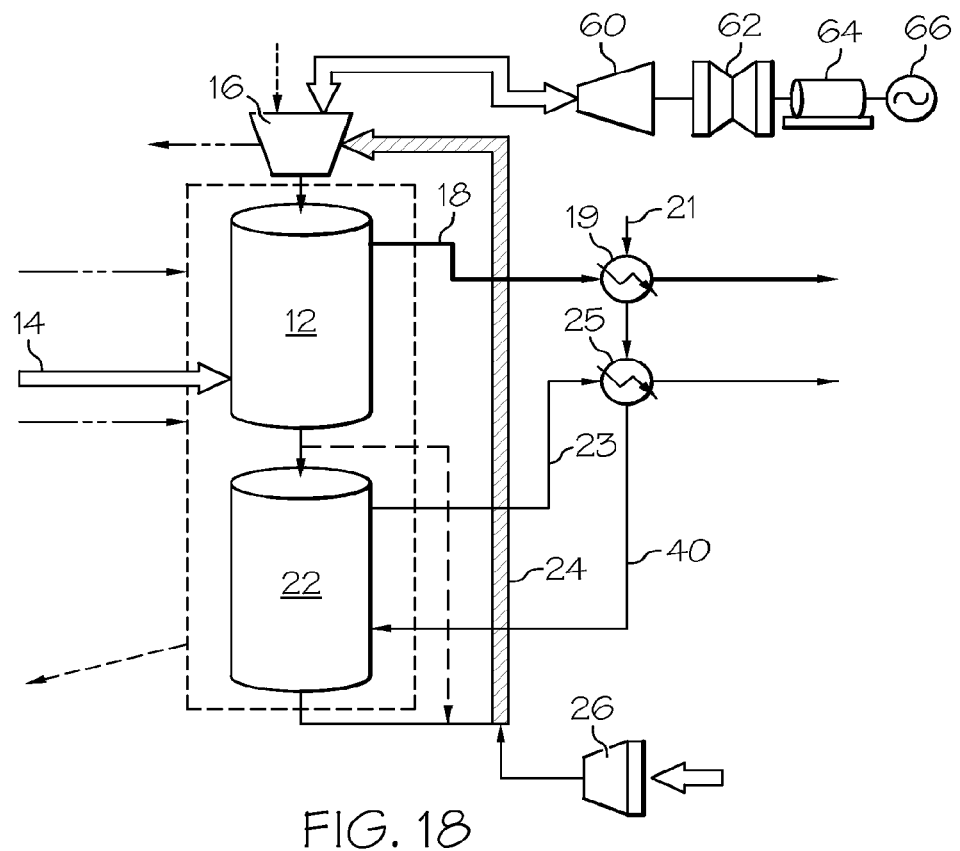
FIG. 18 is a schematic illustration of an embodiment for hydrogen/electricity generation from natural gas or other methane rich gas.

Fuel conversion enhancer such as $CO_2$, steam, and/or hydrogen can also be introduced into the reducer stage 82 to enhance methane conversion based on mechanism similar to that shown in FIG. 3. The heat integration scheme for methane and other gaseous/liquid carbonaceous fuel conversion is similar to that explained in the solid fuel conversion scheme. FIG. 18 illustrates an embodiment for methane conversion.

The solid operating line shown in FIG. 16 is the desirable operating line for syngas conversion. The operating line for methane and other fuel conversion shows similar nature as FIG. 16. Although the slope of the operating line may change at various operating temperatures, fuel compositions, and pressures, the stoicheometric ratio between the metal oxide composite particles and the gaseous fuel is usually maintained at from about 3:1-1.18:1. As a result, the metal oxide conversion usually ranges between 33%-85% while greater than 95% of the gaseous fuel is converted to $CO_2$ and $H_2O$. For example, when methane is used, the metal oxide conversion usually ranges between 35% and 70%. When $Fe_2O_3$ based ceramic composite particles are used, the product from the reducer is a mixture of iron and Wuestite.

The gaseous fuel can be pretreated so that it contains less than 750 ppm of $H_2S$, COS, and some elemental mercury. The reducer configuration and the ceramic composite particles will allow the $H_2S$, COS, and mercury to exit the reducer without reacting with the ceramic composite. As a result, these pollutants can be sequestered along with $CO_2$.

Figure 9:
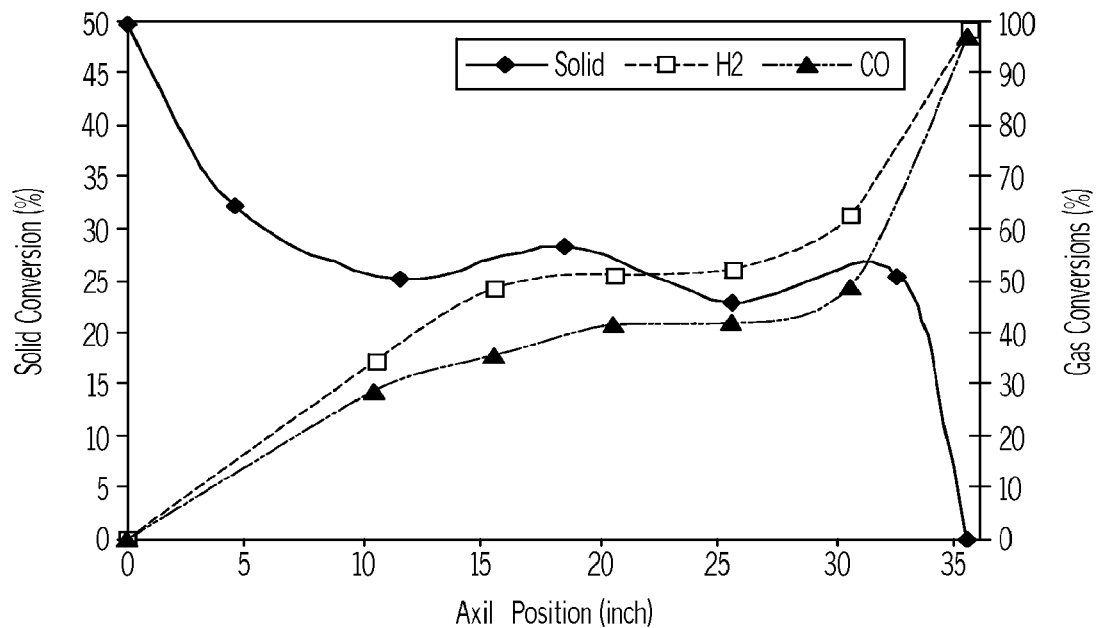
FIG. 9 is a chart showing the conversion of syngas and iron oxide in a moving bed reducer.
Figure 10:
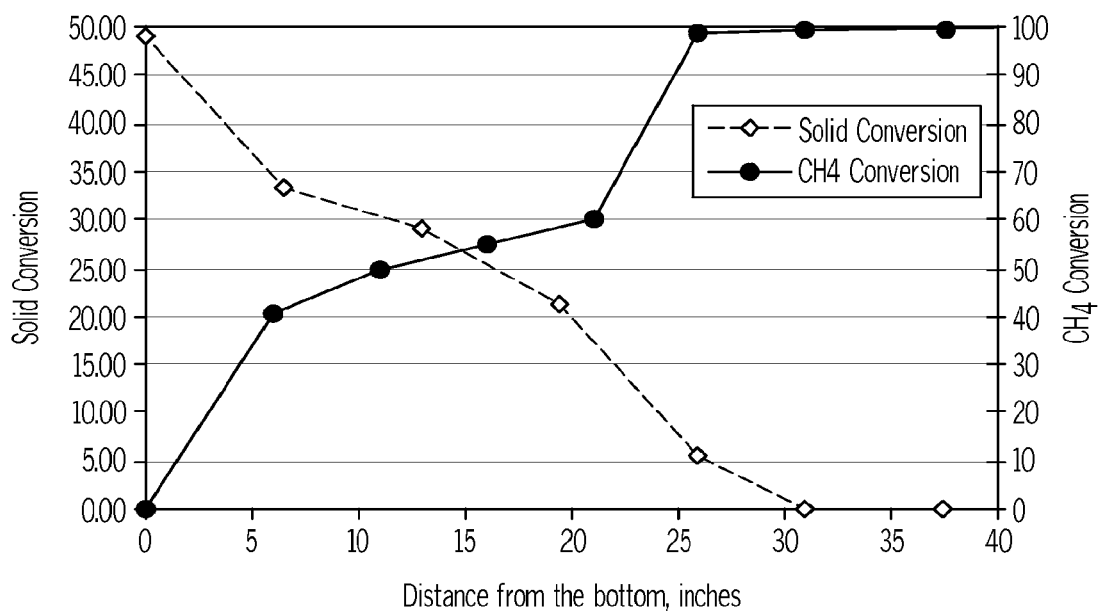
FIG. 10 is a chart showing the conversion of methane and iron oxide in a moving bed reducer.

FIG. 9 illustrates the conversion of syngas and iron oxide in a moving bed reducer stage when syngas is used as the gaseous fuel. FIG. 10 illustrates the conversion of methane and $Fe_2O_3$ in a moving bed reducer stage when methane is used as the gaseous fuel. $Fe_2O_3$-based ceramic composite is used in both cases. As can be seen, more than 99.8% fuel conversion can be achieved with ~50% $Fe_2O_3$ conversion.

A portion of the reduced ceramic composite is then introduced to the oxidizer 84. In the oxidizer, steam and/or $CO_2$ is introduced at or near the bottom and flows in a countercurrent manner relative to solids. The oxidizer configuration and gas and solid conversions are similar to that of the reducer in the solid fuel conversion system discussed previously.

Figure 11:
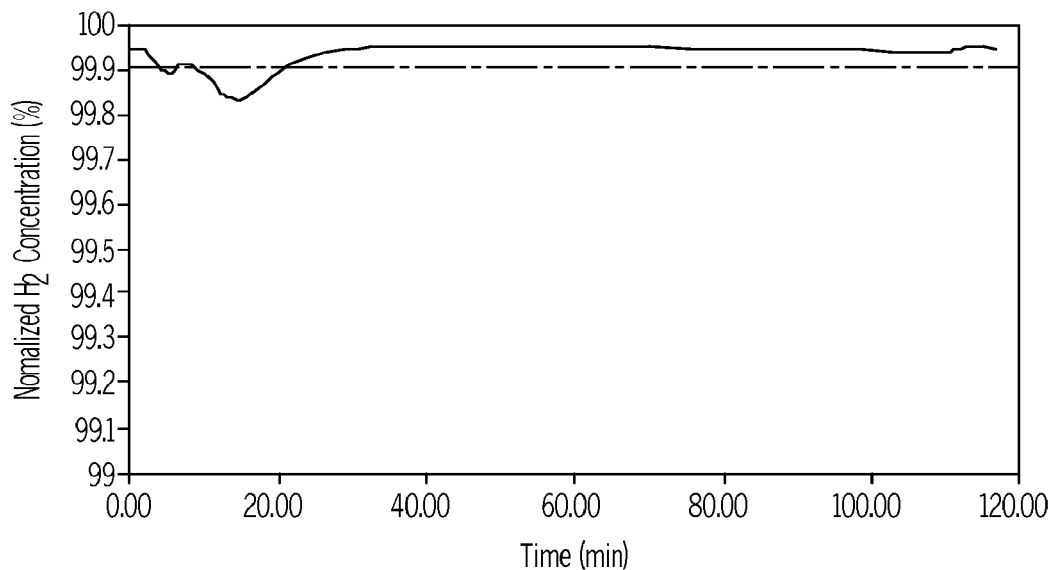
FIG. 11 is a chart showing the concentration of hydrogen produced from a moving bed oxidizer.

FIG. 11 shows the concentration of the hydrogen product during a moving bed oxidizer operation. Average hydrogen purity of >99% was achieved.

The combustor shown in FIG. 8 is similar to the combustor in the system for fuel conversion. A preferred heat integration scheme utilizes the heat from the combustor to provide the heat requirement in the reducer. In a preferred configuration, spent ceramic composite is separated from the other particles using a cyclone or other mechanical separation techniques.

Figure 12:
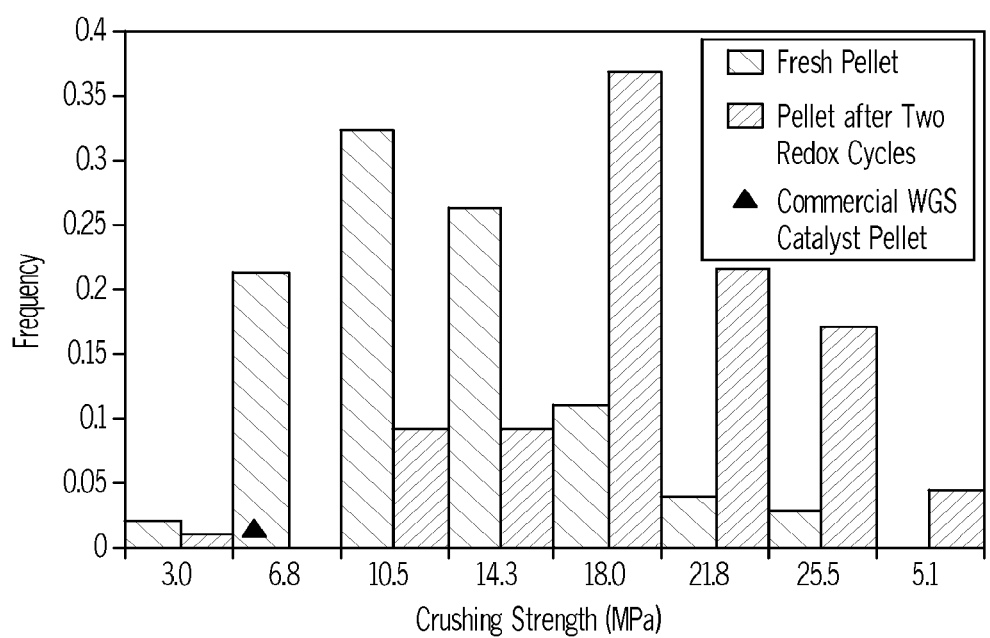
FIG. 12 is a chart showing the crushing strength of an $Fe_2O_3$-based metal oxide composite particle made in accordance with an embodiment of the present invention.

FIG. 12 shows the crushing strength of the ceramic composite. After treatment via reduction-oxidation cycles, the ceramic composite particles show a mean compressive strength of about 20 MPa.

Figure 13:
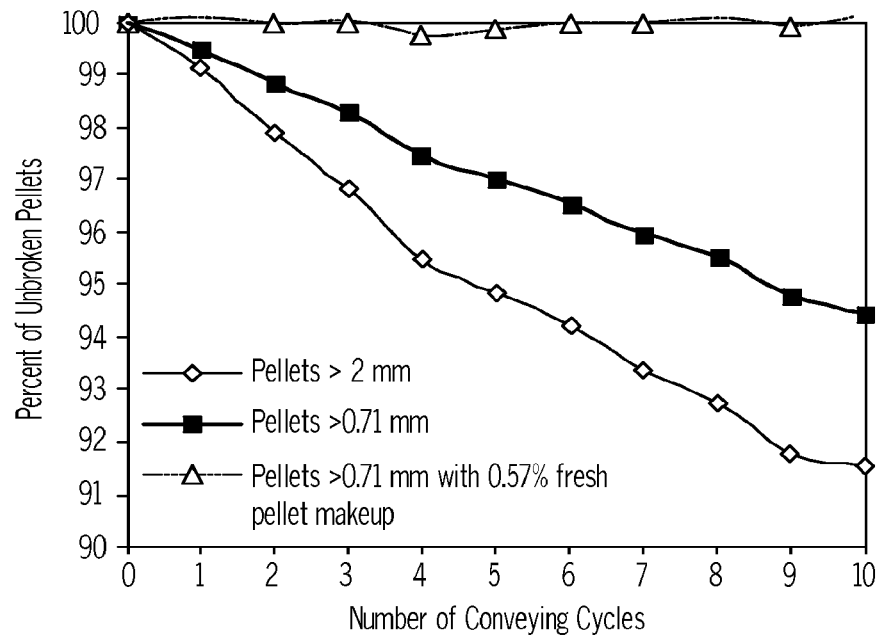
FIG. 13 is a chart showing the attrition rate of oxygen carrier particles after a number of redox cycles.

FIG. 13 shows the attrition rate of the ceramic composite particles. The average attrition of the ceramic composite particles is <0.6%/reduction-oxidation cycle.

Figure 14:
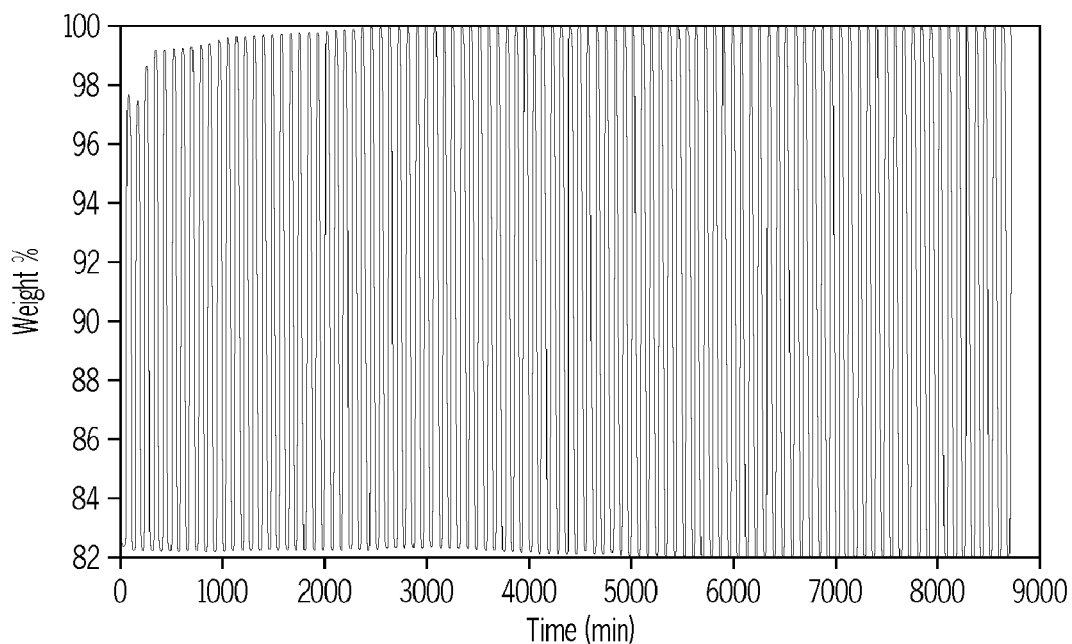
FIG. 14 is a chart showing the reduction-oxidation rates of the oxygen carrier particles with respect to number of redox cycles.

FIG. 14 shows the recyclability of the ceramic composite particles. The ceramic composite particles can sustain more than 100 reduction-oxidation cycles without losing their reactivity when syngas is used as the fuel.

Figure 15:
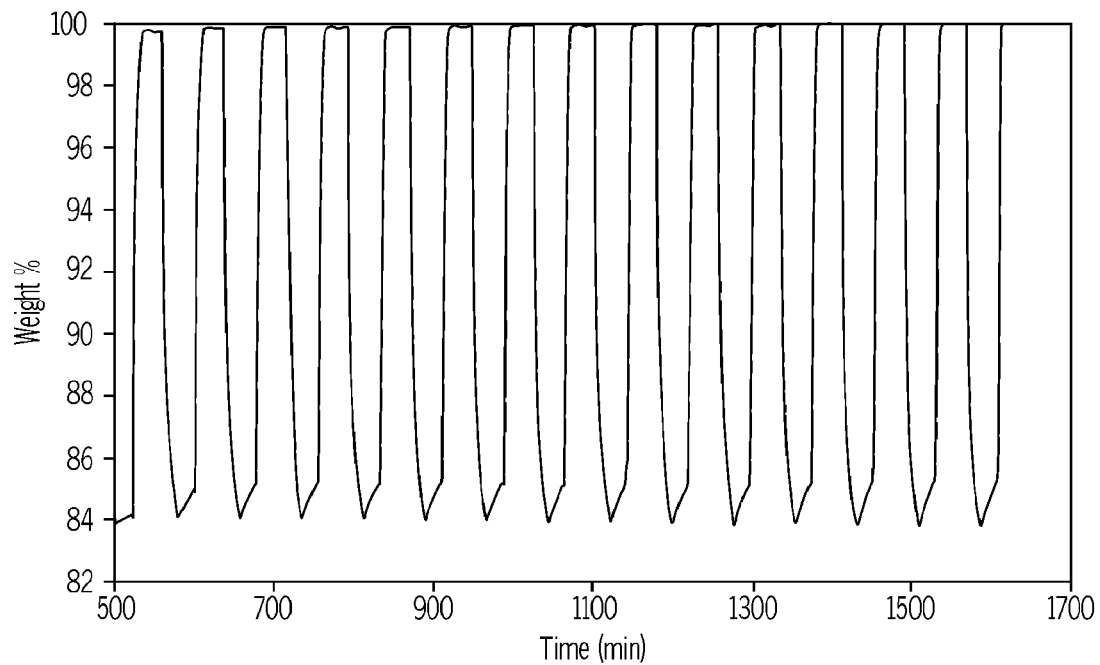
FIG. 15 is a chart showing the reactivity of the oxygen carrier particle after reacting with coal for four reduction-oxidation cycles, syngas for three reduction-oxidation cycles, and natural gas for one reduction-oxidation cycle.

FIG. 15 shows the recyclability of the ceramic composite particles. The ceramic composite particles can react with various ranks of coal, syngas, and hydrocarbons for multiple cycles without losing their reactivity.

When the reducer and the oxidizer are moving beds and the combustor is an entrained bed, the preferred size of the ceramic composite particles are between about 200 μm to about 40 mm. Such a particle size allows for fluidization in the combustor without fluidizing it in the reducer and the oxidizer.

Embodiments of the described systems and methods for converting solid fuel and hydrocarbons to carbon free energy carriers can reach an HHV energy conversion efficiency of up to about 90% for hydrogen production with a typical energy conversion efficiency of about 65-80%. Embodiments of the described systems and methods for converting syngas fuel can reach an HHV energy conversion efficiency of up to about 85% for hydrogen production with a typical energy conversion efficiency of about 55-70%. Table 3 shows the performance of a biomass plant for power and $H_2$ Co-production.

TABLE 3

The performance of a biomass plant for power and $H_2$ Co-production

| | |
|---|---|
| Biomass feed (lb/hr) | 78800 |
| HHV input ($MW_{th}$) | 100 |
| Hydrogen (lb/hr) | 3805 (69.05%) |
| Net Power ($MW_e$) | 4.55 (4.55%) |
| Efficiency (% HHV) | 73.6 |

In one configuration, the reducer can be integrated with a fluidized catalytic cracking unit. The reducer converts gaseous hydrocarbons in the hydrocracker while reducing the ceramic composite. The reduced ceramic composite is then introduced to the oxidizer to generate hydrogen. The hydrogen generated can then be used for hydrocracking.

In some cases, catalysts for reactions such as hydrocarbon reforming or water gas shift can be mixed with the ceramic composite to enhance the fuel conversion. The weight content of the catalyst typically ranges from about 0.01% to about 30%.

It will be apparent to those skilled in the art that various changes may be made without departing from the scope of the invention which is not considered limited to the specific embodiments described in the specification and drawings, but is only limited by the scope of the appended claims.

The invention claimed is:

1. A method of preparing ceramic composite particles comprising:
   mixing a metal oxide with at least one ceramic material to form a mixture;
   granulating said mixture by adding a binding material;
   drying said granulated mixture;
   processing said dried, granulated mixture into particle form such that the length of said particles is greater than about 200 μm;
   heat treating said particles at a temperature of from about 500 to about 1500° C.; and
   reducing and oxidizing said particles.

2. The method of claim 1, wherein the ceramic material is in powder form.

3. The method of claim 1, wherein the binder material is starch, sodium silicate, potassium silicate, or a combination thereof.

4. The method of claim 1, wherein a promoter material is adding in the mixing step before granulation.

5. The method of claim 4, wherein the promoter material comprises a pure metal, a metal oxide, a metal sulfide, or a combination thereof.

6. The method of claim 4, wherein the promoter material comprises Li, Na, K, Rb, Cs, Be, Mg, Ca, Sr, Ba, B, P, V, Cr, Mn, Co, Cu, Zn, Ga, Mo, Rh, Pt, Pd, Ag, Ru, or a combination thereof.

7. The method of claim 4, wherein the ceramic composite comprises up to about 20% by weight of the promoter material.

8. The method of claim 1, wherein the metal oxide comprises Fe, Cu, Ni, Co, Mn, In, or a combination thereof.

9. The method of claim 1, wherein ceramic material comprises SiC, an oxide of Al, Zr, Ti, Y, Si, La, Sr, or Ba, or a combination thereof.

10. The method of claim 1, wherein the ceramic material comprises a natural ore.

11. The method of claim 1, wherein the ceramic material comprises bentonite or sepiolite.

12. The method of claim 1, wherein the ceramic composite comprises $Fe_2O_3$ supported on a support that is a mixture of alumina ($Al_2O_3$) and Anatase ($TiO_2$).

13. The method of claim 1, wherein the step of drying said granulated mixture comprises drying at temperature of about 50° C. to about 500° C. in an air or nitrogen atmosphere.

14. The method of claim 1, wherein the step of drying said granulated mixture reduces the moisture content of the mixture to below 10%.

15. The method of claim 1, wherein the step of granulating said mixture by adding a binding material further comprises adding water to said mixture.

16. The method of claim 1, wherein the step of processing said dried, granulated mixture into particle form such that the length of said particles is greater than about 200 μm, comprises processing said dried, granulated mixture into pellets.

17. The method of claim 16, wherein the pellets are produced by extrusion, granulation, or pressurization.

18. The method of claim 16, where the pellets are produced by pressurization at pressures of 0.1 to 25 MPa.

19. A ceramic composite as claimed in claim 1 that can perform reduction-oxidation reactions for more than 100 cycles without significantly losing its reactivity.

20. A ceramic composite as claimed in claim 1 that can react with different ranks of coal, syngas, and methane for more than 7 cycles without significantly losing its reactivity.

* * * * *